US011693836B2

(12) United States Patent
Chetia et al.

(10) Patent No.: US 11,693,836 B2
(45) Date of Patent: Jul. 4, 2023

(54) SYSTEM, METHOD, AND COMPUTER PROGRAM PRODUCT FOR MONITORING AND IMPROVING DATA QUALITY

(71) Applicant: Visa International Service Association, San Francisco, CA (US)

(72) Inventors: Chiranjeet Chetia, Round Rock, TX (US); Punit Kumar Rajgarhia, San Francisco, CA (US); Hangqi Zhao, Seattle, WA (US); Claudia Carolina Barcenas Cardenas, Austin, TX (US); Jianhua Huang, Cedar Park, TX (US)

(73) Assignee: Visa International Service Association, San Francisco, CA (US)

( * ) Notice: Subject to any disclaimer, the term of this patent is extended or adjusted under 35 U.S.C. 154(b) by 458 days.

(21) Appl. No.: 16/927,593

(22) Filed: Jul. 13, 2020

(65) Prior Publication Data

US 2020/0341954 A1    Oct. 29, 2020

Related U.S. Application Data

(63) Continuation-in-part of application No. 16/742,463, filed on Jan. 14, 2020, now abandoned.

(60) Provisional application No. 62/960,917, filed on Jan. 14, 2020, provisional application No. 62/792,165, filed on Jan. 14, 2019.

(51) Int. Cl.
*G06F 16/00* (2019.01)
*G06F 16/215* (2019.01)
*G06F 40/205* (2020.01)
*G06F 16/906* (2019.01)

(52) U.S. Cl.
CPC .......... *G06F 16/215* (2019.01); *G06F 16/906* (2019.01); *G06F 40/205* (2020.01)

(58) Field of Classification Search
CPC ..... G06F 16/215; G06F 16/906; G06F 40/205
See application file for complete search history.

(56) References Cited

U.S. PATENT DOCUMENTS

| | | | |
|---|---|---|---|
| 8,417,715 B1 * | 4/2013 | Bruckhaus | G06Q 10/04 |
| | | | 705/26.1 |
| 8,639,596 B2 * | 1/2014 | Chew | G06Q 40/00 |
| | | | 705/30 |
| 9,058,406 B2 * | 6/2015 | Soroca | G06Q 30/0261 |
| 10,410,225 B1 * | 9/2019 | Johnston | G06Q 30/0201 |
| 10,467,547 B1 * | 11/2019 | Range | G06N 20/00 |
| 10,515,090 B2 * | 12/2019 | Avagyan | G06F 16/214 |
| 10,679,008 B2 * | 6/2020 | Dubey | G06F 16/3347 |
| 11,210,300 B2 * | 12/2021 | Ignatyev | G06Q 10/00 |

(Continued)

*Primary Examiner* — Leslie Wong
(74) *Attorney, Agent, or Firm* — The Webb Law Firm

(57) ABSTRACT

Provided is a computer-implemented method for monitoring and improving data quality of transaction data that may include receiving transaction data associated with a plurality of payment transactions from an acquirer system. The transaction data may include a transaction record associated with each payment transaction of the plurality of payment transactions. Each transaction record may include a plurality of data fields. Each respective data field of the plurality of data fields may be categorized into a respective type of a plurality of types. A data quality score for each respective data field of the plurality of data fields may be determined based on the respective type of the respective data field. A system and computer program product are also provided.

19 Claims, 7 Drawing Sheets

(56) References Cited

U.S. PATENT DOCUMENTS

| | | | |
|---|---|---|---|
| 11,380,171 B2* | 7/2022 | Chen | G07F 19/201 |
| 2013/0204894 A1* | 8/2013 | Faith | G06F 16/9024 |
| | | | 707/769 |
| 2014/0278730 A1* | 9/2014 | Muhart | G06Q 10/0635 |
| | | | 705/7.28 |
| 2016/0267409 A1* | 9/2016 | Vatnani | G06Q 10/0637 |
| 2018/0246943 A1* | 8/2018 | Avagyan | G06F 16/29 |
| 2019/0164176 A1* | 5/2019 | Pydynowski | H04L 67/535 |
| 2019/0258958 A1* | 8/2019 | Adjaoute | G06F 16/215 |
| 2020/0065785 A1* | 2/2020 | Hart | G06Q 20/085 |
| 2020/0279623 A1* | 9/2020 | Ozeran | G16H 10/60 |
| 2020/0401593 A1* | 12/2020 | Panuganty | G06F 9/4881 |
| 2022/0076231 A1* | 3/2022 | Farrell | G06Q 20/3224 |

* cited by examiner

SYSTEM, METHOD, AND COMPUTER PROGRAM PRODUCT FOR MONITORING AND IMPROVING DATA QUALITY

CROSS REFERENCE TO RELATED APPLICATIONS

This application is a continuation-in-part of U.S. patent application Ser. No. 16/742,463, filed Jan. 14, 2020, which claims priority to U.S. Provisional Patent Application Nos. 62/960,917, filed Jan. 14, 2020, and 62/792,165, filed Jan. 14, 2019, the disclosures of which are hereby incorporated by reference in their entireties.

BACKGROUND

1. Field

This disclosure relates generally to systems, devices, products, apparatuses, and methods that are used for monitoring and improving data quality, and in some particular embodiments, to a system, method, and product for monitoring and improving data quality of transaction data.

2. Technical Considerations

Data quality may refer to the state of qualitative and/or quantitative pieces of information. Data may be generally considered high quality if it is fit for an intended use in operations, decision making, and/or planning. Additionally, data may be deemed to be of high quality if the data correctly represents a real-world construct to which the data refers. Furthermore, as a number of data sources increases, the question of internal data consistency becomes significant, regardless of fitness for use for any particular external purpose. In some instances, data cleansing, including standardization, may be required in order to ensure data is of high quality.

Payment transaction processing methods may be described with regard to three levels of data to be included in a transaction message associated with a payment transaction (e.g., a credit card transaction): Level 1 data, Level 2 data, and Level 3 data (e.g., Level I, Level II, and Level III). Each level of data may be defined by the amount of data that is transmitted to an entity (e.g., a payment processing entity) to complete a payment transaction. With regard to relationships between the levels, Level 1 data may have the lowest requirement for an amount data that is included in a payment transaction and/or may have the highest associated processing costs for a payment transaction. In some instances, Level 2 and Level 3 data may include a set of additional information over what is included in Level 1 data that can be transmitted during a payment transaction. In some instances, Level 2 data and/or Level 3 data may provide more information for business accounts, commercial accounts, corporate accounts, purchasing accounts, and/or government cardholder accounts used in payment transactions.

In some instances, a payment transaction submitted with Level 2 data and/or Level 3 data may obtain lower interchange rates and/or provide a merchant involved in the payment transaction with a lower processing cost. Therefore, the merchant may elect to transmit Level 2 data and Level 3 data whenever possible during a payment transaction.

However, during a payment transaction a merchant may submit a transaction message where one or more data fields of the transaction message, such as one or more data fields associated with Level 2 data and/or Level 3 data, do not contain values or contain incorrect values (e.g., erroneous values, falsified values, improperly formatted values, any combination thereof, and/or the like). In such a situation, the payment transaction may contain values that do not allow for processing of the payment transaction or do not allow for processing the payment transaction in an efficient amount of time. In addition, where a transaction message does do not contain values or contains incorrect values, a database may not be able to be properly constructed.

Moreover, such issues with data quality (e.g., missing values, incorrect values, and/or the like) may be difficult to identify. For example, manual review may be burdensome, time consuming, and/or expensive in terms of manual efforts. Additionally, manual review may be impractical or even impossible for large data sets (e.g., transaction records associated with millions of transactions per day and/or the like). Further, data fields may have an unexpected ordering and/or data within at least some data fields may not be formatted in an expected way, which may make creating algorithms for automated review of data quality difficult.

SUMMARY

Accordingly, systems, devices, products, apparatuses, and/or methods for monitoring and improving data quality are disclosed that overcome some or all of the deficiencies identified above.

According to non-limiting embodiments, provided is a computer-implemented method for monitoring and improving data quality of transaction data. In some non-limiting embodiments, a computer-implemented method for monitoring and improving data quality of transaction data may include receiving transaction data associated with a plurality of payment transactions from an acquirer system. The transaction data may include a transaction record associated with each payment transaction of the plurality of payment transactions. Each transaction record may include a plurality of data fields. Each respective data field of the plurality of data fields may be categorized into a respective type of a plurality of types. A data quality score for each respective data field of the plurality of data fields may be determined based on the respective type of the respective data field.

In some non-limiting embodiments, a subset of the plurality of data fields may be selected based on an application. Additionally or alternatively, categorizing may include categorizing each respective data field of the subset into the respective type of the plurality of types.

In some non-limiting embodiments, the plurality of types may include a date type, a categorical type, an identifier type, a textual type, and a numeric type. Additionally or alternatively, categorizing may include categorizing each respective data field of the plurality of data fields into one of the date type, the categorical type, the identifier type, the textual type, or the numeric type. In some non-limiting embodiments, categorizing may include, for each respective data field, categorizing the respective data field into the date type if data contained in the respective data field at least one of: is formatted as at least one of a standard date format, a standard time format, a standard date and time format, or any combination thereof; satisfies at least one of a date function, a time function, a date and time function, or any combination thereof; or any combination thereof. Additionally or alternatively, categorizing may include categorizing the respective data field into the categorical type based on a statistical distribution of values in the data contained in the respective data field and a threshold of unique values. Additionally or alternatively, categorizing may include categorizing the respective data field into the identifier type based on a degree of uniqueness of the values in the data contained in the respective data field. Additionally or alternatively, categorizing may include categorizing the respective data field into the textual type based on at least one of a plurality of regular expression functions; a number of combinations of punctuation, alphabetical characters, and digits of the data contained in the respective data field; or any combination thereof. Additionally or alternatively, categorizing may include categorizing the respective data field into the numeric type if the data contained in the respective data field includes only digits and up to one decimal point.

In some non-limiting embodiments, a first data field of the plurality of data fields may include a textual data field. In some non-limiting embodiments, data pre-processing may be conducted on the transaction data. Additionally or alternatively, feature values associated with the textual data field in each transaction record may be determined. Additionally or alternatively, the feature values may be used in a parsing layer of a natural language processing (NLP) model after conducting data pre-processing on the transaction data. Additionally or alternatively, whether the feature values associated with the textual data field satisfy at least one rule associated with the parsing layer of the NLP model may be determined. Additionally or alternatively, determining the data quality score may include determining the data quality score for the textual data field included in the transaction data based on determining whether the feature values associated with the textual data field satisfy the at least one rule associated with the parsing layer of the NLP model.

In some non-limiting embodiments, conducting the data pre-processing may include performing a text cleaning process on textual data located in a first textual data field of a first transaction record to produce cleaned textual data. Additionally or alternatively, a value that includes the cleaned textual data may be stored in a first modified textual data field associated with the first transaction record. In some non-limiting embodiments, performing the text cleaning process may include changing upper case alphabetical characters to lower case alphabetical characters in the textual data located in the first textual data field of the first transaction record. Additionally or alternatively, specified characters may be removed from the textual data located in the first textual data field of the first transaction record. For example, the specified characters may include at least one of the following: a number character, an empty character space, a hash code character, a punctuation character, or any combination thereof.

In some non-limiting embodiments, conducting the data pre-processing may include extracting a root of a word that is included in textual data located in a first textual data field of a first transaction record. Additionally or alternatively, a value that includes the root of the word may be stored in a first modified textual data field associated with the first transaction record.

In some non-limiting embodiments, whether textual data located in a first textual data field of a first transaction record corresponds to a specified stop-word may be determined. Additionally or alternatively, a lowest value of a data quality score for the textual data located in the first textual data field may be determined based on determining that the textual data located in the first textual data field of the first transaction record corresponds to the specified stop-word. Additionally or alternatively, the lowest value of the data quality score may be assigned to the textual data located in the first textual data field.

In some non-limiting embodiments, whether textual data located in a first textual data field of a first transaction record corresponds to a historical textual description may be determined. Additionally or alternatively, a data quality score for the textual data located in the first textual data field may be determined based on determining that the textual data located in the first textual data field of the first transaction record corresponds to the historical textual description.

In some non-limiting embodiments, determining the data quality score for the textual data located in the first textual data field may include determining the data quality score for the textual data located in the first textual data field based on a level of correspondence between the textual data located in the first textual data field of the first transaction record and the historical textual description.

In some non-limiting embodiments, a subset of data fields of the plurality of data fields may include numeric data fields. Additionally or alternatively, a vector comprising a plurality of elements may be generated. For example, the plurality of elements may include an element for each value of the numeric data fields and for each interaction of at least two values of the numeric data fields. Additionally or alternatively, a plurality of tuples may be generated based on the plurality of elements. In some non-limiting embodiments, a regression may be performed on each tuple of the plurality of tuples to provide an error value for each tuple of the plurality of tuples. Additionally or alternatively, the error value of at least one tuple of the plurality of tuples may be determined to satisfy a data quality threshold. In some non-limiting embodiments, at least one of a coefficient value, an intercept value, or any combination thereof may be stored based on the regression for the at least one tuple that satisfies the data quality threshold. In some non-limiting embodiments, each interaction may include a multiplication of the value of a first numeric data field of the numeric data fields and the value of a second numeric data field of the numeric data fields. In some non-limiting embodiments, each tuple of the plurality of tuples may include a subset of three elements of the plurality of elements.

In some non-limiting embodiments, a first subset of data fields of the plurality of data fields may include date data fields. In some non-limiting embodiments, a formatting of each date data field may be detected. Additionally or alternatively, a relationship distribution between each date data field and at least one other date data field may be determined. In some non-limiting embodiments, determining the data quality score may include determining the data quality score for each date data field based on the formatting and the relationship distribution.

In some non-limiting embodiments, a first data field of the plurality of data fields may include an identifier data field, and/or each transaction record may include identifier data associated with the identifier data field. In some non-limiting embodiments, the identifier data associated with the identifier data field in each transaction record may be determined to be unique from the identifier data associated with the textual data field in other transaction records of the transaction data. Additionally or alternatively, the identifier data associated with the identifier data field in each transaction record may be determined to be unique from historical identifier data associated with the identifier data field in historical transaction records.

In some non-limiting embodiments, a first data field of the plurality of data fields may include a categorical data field, and/or each transaction record may include categorical data associated with the categorical data field. In some non-limiting embodiments, the categorical data associated with the categorical data field in each transaction record may be determined to match historical categorical data associated with the categorical data field in at least one historical transaction record. Additionally or alternatively, a percentage of transaction records for which the categorical data associated with the categorical data field therein matches the historical categorical data associated with the categorical data field in the at least one historical transaction record may be determined. In some non-limiting embodiments, determining the data quality score may include determining the data quality score for the categorical data field based on the percentage.

According to non-limiting embodiments, provided is a system for monitoring and improving data quality of transaction data. In some non-limiting embodiments, the system for monitoring and improving data quality of transaction data may include at least one processor programmed or configured to receive transaction data associated with a plurality of payment transactions from an acquirer system. The transaction data may include a transaction record associated with each payment transaction of the plurality of payment transactions. Each transaction record may include a plurality of data fields. Each respective data field of the plurality of data fields may be categorized into a respective type of a plurality of types. A data quality score for each respective data field of the plurality of data fields may be determined based on the respective type of the respective data field.

In some non-limiting embodiments, a subset of the plurality of data fields may be selected based on an application. Additionally or alternatively, categorizing may include categorizing each respective data field of the subset into the respective type of the plurality of types.

In some non-limiting embodiments, the plurality of types may include a date type, a categorical type, an identifier type, a textual type, and a numeric type. Additionally or alternatively, categorizing may include categorizing each respective data field of the plurality of data fields into one of the date type, the categorical type, the identifier type, the textual type, or the numeric type. In some non-limiting embodiments, categorizing may include, for each respective data field, categorizing the respective data field into the date type if data contained in the respective data field at least one of: is formatted as at least one of a standard date format, a standard time format, a standard date and time format, or any combination thereof; satisfies at least one of a date function, a time function, a date and time function, or any combination thereof; or any combination thereof. Additionally or alternatively, categorizing may include categorizing the respective data field into the categorical type based on a statistical distribution of values in the data contained in the respective data field and a threshold of unique values. Additionally or alternatively, categorizing may include categorizing the respective data field into the identifier type based on a degree of uniqueness of the values in the data contained in the respective data field. Additionally or alternatively, categorizing may include categorizing the respective data field into the textual type based on at least one of a plurality of regular expression functions; a number of combinations of punctuation, alphabetical characters, and digits of the data contained in the respective data field; or any combination thereof. Additionally or alternatively, categorizing may include categorizing the respective data field into the numeric type if the data contained in the respective data field includes only digits and up to one decimal point.

In some non-limiting embodiments, a first data field of the plurality of data fields may include a textual data field. In some non-limiting embodiments, data pre-processing may be conducted on the transaction data. Additionally or alternatively, feature values associated with the textual data field in each transaction record may be determined. Additionally or alternatively, the feature values may be used in a parsing layer of an NLP model after conducting data pre-processing on the transaction data. Additionally or alternatively, whether the feature values associated with the textual data field satisfy at least one rule associated with the parsing layer of the NLP model may be determined. Additionally or alternatively, determining the data quality score may include determining the data quality score for the textual data field included in the transaction data based on determining whether the feature values associated with the textual data field satisfy the at least one rule associated with the parsing layer of the NLP model.

In some non-limiting embodiments, conducting the data pre-processing may include performing a text cleaning process on textual data located in a first textual data field of a first transaction record to produce cleaned textual data. Additionally or alternatively, a value that includes the cleaned textual data may be stored in a first modified textual data field associated with the first transaction record. In some non-limiting embodiments, performing the text cleaning process may include changing upper case alphabetical characters to lower case alphabetical characters in the textual data located in the first textual data field of the first transaction record. Additionally or alternatively, specified characters may be removed from the textual data located in the first textual data field of the first transaction record. For example, the specified characters may include at least one of the following: a number character, an empty character space, a hash code character, a punctuation character, or any combination thereof.

In some non-limiting embodiments, conducting the data pre-processing may include extracting a root of a word that is included in textual data located in a first textual data field of a first transaction record. Additionally or alternatively, a value that includes the root of the word may be stored in a first modified textual data field associated with the first transaction record.

In some non-limiting embodiments, whether textual data located in a first textual data field of a first transaction record corresponds to a specified stop-word may be determined. Additionally or alternatively, a lowest value of a data quality score for the textual data located in the first textual data field may be determined based on determining that the textual data located in the first textual data field of the first transaction record corresponds to the specified stop-word. Additionally or alternatively, the lowest value of the data quality score may be assigned to the textual data located in the first textual data field.

In some non-limiting embodiments, whether textual data located in a first textual data field of a first transaction record corresponds to a historical textual description may be determined. Additionally or alternatively, a data quality score for the textual data located in the first textual data field may be determined based on determining that the textual data located in the first textual data field of the first transaction record corresponds to the historical textual description.

In some non-limiting embodiments, determining the data quality score for the textual data located in the first textual data field may include determining the data quality score for the textual data located in the first textual data field based on a level of correspondence between the textual data located in the first textual data field of the first transaction record and the historical textual description.

In some non-limiting embodiments, a subset of data fields of the plurality of data fields may include numeric data fields. Additionally or alternatively, a vector comprising a plurality of elements may be generated. For example, the plurality of elements may include an element for each value of the numeric data fields and for each interaction of at least two values of the numeric data fields. Additionally or alternatively, a plurality of tuples may be generated based on the plurality of elements. In some non-limiting embodiments, a regression may be performed on each tuple of the plurality of tuples to provide an error value for each tuple of the plurality of tuples. Additionally or alternatively, the error value of at least one tuple of the plurality of tuples may be determined to satisfy a data quality threshold. In some non-limiting embodiments, at least one of a coefficient value, an intercept value, or any combination thereof may be stored based on the regression for the at least one tuple that satisfies the data quality threshold. In some non-limiting embodiments, each interaction may include a multiplication of the value of a first numeric data field of the numeric data fields and the value of a second numeric data field of the numeric data fields. In some non-limiting embodiments, each tuple of the plurality of tuples may include a subset of three elements of the plurality of elements.

In some non-limiting embodiments, a first subset of data fields of the plurality of data fields may include date data fields. In some non-limiting embodiments, a formatting of each date data field may be detected. Additionally or alternatively, a relationship distribution between each date data field and at least one other date data field may be determined. In some non-limiting embodiments, determining the data quality score may include determining the data quality score for each date data field based on the formatting and the relationship distribution.

In some non-limiting embodiments, a first data field of the plurality of data fields may include an identifier data field, and/or each transaction record may include identifier data associated with the identifier data field. In some non-limiting embodiments, the identifier data associated with the identifier data field in each transaction record may be determined to be unique from the identifier data associated with the textual data field in other transaction records of the transaction data. Additionally or alternatively, the identifier data associated with the identifier data field in each transaction record may be determined to be unique from historical identifier data associated with the identifier data field in historical transaction records.

In some non-limiting embodiments, a first data field of the plurality of data fields may include a categorical data field, and/or each transaction record may include categorical data associated with the categorical data field. In some non-limiting embodiments, the categorical data associated with the categorical data field in each transaction record may be determined to match historical categorical data associated with the categorical data field in at least one historical transaction record. Additionally or alternatively, a percentage of transaction records for which the categorical data associated with the categorical data field therein matches the historical categorical data associated with the categorical data field in the at least one historical transaction record may be determined. In some non-limiting embodiments, determining the data quality score may include determining the data quality score for the categorical data field based on the percentage.

According to non-limiting embodiments, provided is a computer program product for monitoring and improving data quality of transaction data. The computer program product may include at least one non-transitory computer-readable medium including one or more instructions that, when executed by at least one processor, cause the at least one processor to receive transaction data associated with a plurality of payment transactions from an acquirer system. The transaction data may include a transaction record associated with each payment transaction of the plurality of payment transactions. Each transaction record may include a plurality of data fields. Each respective data field of the plurality of data fields may be categorized into a respective type of a plurality of types. A data quality score for each respective data field of the plurality of data fields may be determined based on the respective type of the respective data field.

In some non-limiting embodiments, a subset of the plurality of data fields may be selected based on an application. Additionally or alternatively, categorizing may include categorizing each respective data field of the subset into the respective type of the plurality of types.

In some non-limiting embodiments, the plurality of types may include a date type, a categorical type, an identifier type, a textual type, and a numeric type. Additionally or alternatively, categorizing may include categorizing each respective data field of the plurality of data fields into one of the date type, the categorical type, the identifier type, the textual type, or the numeric type. In some non-limiting embodiments, categorizing may include, for each respective data field, categorizing the respective data field into the date type if data contained in the respective data field at least one of: is formatted as at least one of a standard date format, a standard time format, a standard date and time format, or any combination thereof; satisfies at least one of a date function, a time function, a date and time function, or any combination thereof; or any combination thereof. Additionally or alternatively, categorizing may include categorizing the respective data field into the categorical type based on a statistical distribution of values in the data contained in the respective data field and a threshold of unique values. Additionally or alternatively, categorizing may include categorizing the respective data field into the identifier type based on a degree of uniqueness of the values in the data contained in the respective data field. Additionally or alternatively, categorizing may include categorizing the respective data field into the textual type based on at least one of a plurality of regular expression functions; a number of combinations of punctuation, alphabetical characters, and/or digits of the data contained in the respective data field; or any combination thereof. Additionally or alternatively, categorizing may include categorizing the respective data field into the numeric type if the data contained in the respective data field includes only digits and up to one decimal point.

In some non-limiting embodiments, a first data field of the plurality of data fields may include a textual data field. In some non-limiting embodiments, data pre-processing may be conducted on the transaction data. Additionally or alternatively, feature values associated with the textual data field in each transaction record may be determined. Additionally or alternatively, the feature values may be used in a parsing layer of an NLP model after conducting data pre-processing on the transaction data. Additionally or alternatively, whether the feature values associated with the textual data field satisfy at least one rule associated with the parsing layer of the NLP model may be determined. Additionally or alternatively, determining the data quality score may include determining the data quality score for the textual data field included in the transaction data based on determining whether the feature values associated with the textual data field satisfy the at least one rule associated with the parsing layer of the NLP model.

In some non-limiting embodiments, conducting the data pre-processing may include performing a text cleaning process on textual data located in a first textual data field of a first transaction record to produce cleaned textual data. Additionally or alternatively, a value that includes the cleaned textual data may be stored in a first modified textual data field associated with the first transaction record. In some non-limiting embodiments, performing the text cleaning process may include changing upper case alphabetical characters to lower case alphabetical characters in the textual data located in the first textual data field of the first transaction record. Additionally or alternatively, specified characters may be removed from the textual data located in the first textual data field of the first transaction record. For example, the specified characters may include at least one of the following: a number character, an empty character space, a hash code character, a punctuation character, or any combination thereof.

In some non-limiting embodiments, conducting the data pre-processing may include extracting a root of a word that is included in textual data located in a first textual data field of a first transaction record. Additionally or alternatively, a value that includes the root of the word may be stored in a first modified textual data field associated with the first transaction record.

In some non-limiting embodiments, whether textual data located in a first textual data field of a first transaction record corresponds to a specified stop-word may be determined. Additionally or alternatively, a lowest value of a data quality score for the textual data located in the first textual data field may be determined based on determining that the textual data located in the first textual data field of the first transaction record corresponds to the specified stop-word. Additionally or alternatively, the lowest value of the data quality score may be assigned to the textual data located in the first textual data field.

In some non-limiting embodiments, whether textual data located in a first textual data field of a first transaction record corresponds to a historical textual description may be determined. Additionally or alternatively, a data quality score for the textual data located in the first textual data field may be determined based on determining that the textual data located in the first textual data field of the first transaction record corresponds to the historical textual description.

In some non-limiting embodiments, determining the data quality score for the textual data located in the first textual data field may include determining the data quality score for the textual data located in the first textual data field based on a level of correspondence between the textual data located in the first textual data field of the first transaction record and the historical textual description.

In some non-limiting embodiments, a subset of data fields of the plurality of data fields may include numeric data fields. Additionally or alternatively, a vector comprising a plurality of elements may be generated. For example, the plurality of elements may include an element for each value of the numeric data fields and for each interaction of at least two values of the numeric data fields. Additionally or alternatively, a plurality of tuples may be generated based on the plurality of elements. In some non-limiting embodiments, a regression may be performed on each tuple of the plurality of tuples to provide an error value for each tuple of the plurality of tuples. Additionally or alternatively, the error value of at least one tuple of the plurality of tuples may be determined to satisfy a data quality threshold. In some non-limiting embodiments, at least one of a coefficient value, an intercept value, or any combination thereof may be stored based on the regression for the at least one tuple that satisfies the data quality threshold. In some non-limiting embodiments, each interaction may include a multiplication of the value of a first numeric data field of the numeric data fields and the value of a second numeric data field of the numeric data fields. In some non-limiting embodiments, each tuple of the plurality of tuples may include a subset of three elements of the plurality of elements.

In some non-limiting embodiments, a first subset of data fields of the plurality of data fields may include date data fields. In some non-limiting embodiments, a formatting of each date data field may be detected. Additionally or alternatively, a relationship distribution between each date data field and at least one other date data field may be determined. In some non-limiting embodiments, determining the data quality score may include determining the data quality score for each date data field based on the formatting and the relationship distribution.

In some non-limiting embodiments, a first data field of the plurality of data fields may include an identifier data field, and/or each transaction record may include identifier data associated with the identifier data field. In some non-limiting embodiments, the identifier data associated with the identifier data field in each transaction record may be determined to be unique from the identifier data associated with the textual data field in other transaction records of the transaction data. Additionally or alternatively, the identifier data associated with the identifier data field in each transaction record may be determined to be unique from historical identifier data associated with the identifier data field in historical transaction records.

In some non-limiting embodiments, a first data field of the plurality of data fields may include a categorical data field, and/or each transaction record may include categorical data associated with the categorical data field. In some non-limiting embodiments, the categorical data associated with the categorical data field in each transaction record may be determined to match historical categorical data associated with the categorical data field in at least one historical transaction record. Additionally or alternatively, a percentage of transaction records for which the categorical data associated with the categorical data field therein matches the historical categorical data associated with the categorical data field in the at least one historical transaction record may be determined. In some non-limiting embodiments, determining the data quality score may include determining the data quality score for the categorical data field based on the percentage.

Further embodiments are set forth in the following numbered clauses:

Clause 1: A computer-implemented method for monitoring and improving data quality of transaction data, comprising: receiving, with at least one processor, transaction data associated with a plurality of payment transactions from an acquirer system, the transaction data comprising a transaction record associated with each payment transaction of the plurality of payment transactions, each transaction record comprising a plurality of data fields; categorizing, with at least one processor, each respective data field of the plurality of data fields into a respective type of a plurality of types; and determining, with at least one processor, a data quality score for each respective data field of the plurality of data fields based on the respective type of the respective data field.

Clause 2: The computer-implemented method of clause 1, further comprising: selecting, with at least one processor, a subset of the plurality of data fields based on an application, wherein categorizing comprises categorizing each respective data field of the subset into the respective type of the plurality of types.

Clause 3: The computer-implemented method of any preceding clause, wherein the plurality of types comprises a date type, a categorical type, an identifier type, a textual type, and a numeric type, and wherein categorizing comprises categorizing each respective data field of the plurality of data fields into one of the date type, the categorical type, the identifier type, the textual type, or the numeric type.

Clause 4: The computer-implemented method of any preceding clause, wherein categorizing comprises, for each respective data field: categorizing the respective data field into the date type if data contained in the respective data field at least one of: is formatted as at least one of a standard date format, a standard time format, a standard date and time format, or any combination thereof; satisfies at least one of a date function, a time function, a date and time function, or any combination thereof; or any combination thereof; categorizing the respective data field into the categorical type based on a statistical distribution of values in the data contained in the respective data field and a threshold of unique values; categorizing the respective data field into the identifier type based on a degree of uniqueness of the values in the data contained in the respective data field; categorizing the respective data field into the textual type based on at least one of a plurality of regular expression functions; a number of combinations of punctuation, alphabetical characters, and digits of the data contained in the respective data field; or any combination thereof; and categorizing the respective data field into the numeric type if the data contained in the respective data field includes only digits and up to one decimal point.

Clause 5: The computer-implemented method of any preceding clause, wherein a first data field of the plurality of data fields comprises a textual data field, the method further comprising: conducting, with at least one processor, data pre-processing on the transaction data; determining, with at least one processor, feature values associated with the textual data field in each transaction record, wherein the feature values are used in a parsing layer of a natural language processing (NLP) model after conducting data pre-processing on the transaction data; and determining, with at least one processor, whether the feature values associated with the textual data field satisfy at least one rule associated with the parsing layer of the NLP model, wherein determining the data quality score comprises determining the data quality score for the textual data field included in the transaction data based on determining whether the feature values associated with the textual data field satisfy the at least one rule associated with the parsing layer of the NLP model.

Clause 6: The computer-implemented method of any preceding clause, wherein conducting the data pre-processing comprises: performing a text cleaning process on textual data located in a first textual data field of a first transaction record to produce cleaned textual data; and storing a value that includes the cleaned textual data in a first modified textual data field associated with the first transaction record.

Clause 7: The computer-implemented method of any preceding clause, wherein performing the text cleaning process comprises: changing upper case alphabetical characters to lower case alphabetical characters in the textual data located in the first textual data field of the first transaction record; and removing specified characters from the textual data located in the first textual data field of the first transaction record, wherein the specified characters include at least one of the following: a number character, an empty character space, a hash code character, a punctuation character, or any combination thereof.

Clause 8: The computer-implemented method of any preceding clause, wherein conducting the data pre-processing comprises: extracting a root of a word that is included in textual data located in a first textual data field of a first transaction record; and storing a value that includes the root of the word in a first modified textual data field associated with the first transaction record.

Clause 9: The computer-implemented method of any preceding clause, further comprising: determining whether textual data located in a first textual data field of a first transaction record corresponds to a specified stop-word; determining a lowest value of a data quality score for the textual data located in the first textual data field based on determining that the textual data located in the first textual data field of the first transaction record corresponds to the specified stop-word; and assigning the lowest value of the data quality score to the textual data located in the first textual data field.

Clause 10: The computer-implemented method of any preceding clause, further comprising: determining whether textual data located in a first textual data field of a first transaction record corresponds to a historical textual description; and determining a data quality score for the textual data located in the first textual data field based on determining that the textual data located in the first textual data field of the first transaction record corresponds to the historical textual description.

Clause 11: The computer-implemented method of any preceding clause, wherein determining the data quality score for the textual data located in the first textual data field comprises: determining the data quality score for the textual data located in the first textual data field based on a level of correspondence between the textual data located in the first textual data field of the first transaction record and the historical textual description.

Clause 12: The computer-implemented method of any preceding clause, wherein a first subset of data fields of the plurality of data fields comprises numeric data fields, the method further comprising: generating, with at least one processor, a vector comprising a plurality of elements, the plurality of elements comprising an element for each value of the numeric data fields and for each interaction of at least two values of the numeric data fields; generating, with at least one processor, a plurality of tuples based on the plurality of elements; performing, with at least one processor, a regression on each tuple of the plurality of tuples to provide an error value for each tuple of the plurality of tuples; determining, with at least one processor, the error value of at least one tuple of the plurality of tuples satisfies a data quality threshold; and storing, with at least one processor, at least one of a coefficient value, an intercept value, or any combination thereof based on the regression for the at least one tuple that satisfies the data quality threshold.

Clause 13: The computer-implemented method of any preceding clause, wherein each interaction comprises a multiplication of the value of a first numeric data field of the numeric data fields and the value of a second numeric data field of the numeric data fields.

Clause 14: The computer-implemented method of any preceding clause, wherein each tuple of the plurality of tuples comprises a subset of three elements of the plurality of elements.

Clause 15: The computer-implemented method of any preceding clause, wherein a first subset of data fields of the plurality of data fields comprises date data fields, the method further comprising: detecting, with at least one processor, a formatting of each date data field; and determining, with at least one processor, a relationship distribution between each date data field and at least one other date data field, wherein determining the data quality score comprises determining the data quality score for each date data field based on the formatting and the relationship distribution.

Clause 16: The computer-implemented method of any preceding clause, wherein a first data field of the plurality of data fields comprises an identifier data field and each transaction record comprises identifier data associated with the identifier data field, the method further comprising: determining, with at least one processor, the identifier data associated with the identifier data field in each transaction record is unique from the identifier data associated with the textual data field in other transaction records of the transaction data; and determining, with at least one processor, the identifier data associated with the identifier data field in each transaction record is unique from historical identifier data associated with the identifier data field in historical transaction records.

Clause 17: The computer-implemented method of any preceding clause, wherein a first data field of the plurality of data fields comprises a categorical data field and each transaction record comprises categorical data associated with the categorical data field, the method further comprising: determining, with at least one processor, the categorical data associated with the categorical data field in each transaction record matches historical categorical data associated with the categorical data field in at least one historical transaction record; and determining, with at least one processor, a percentage of transaction records for which the categorical data associated with the categorical data field therein matches the historical categorical data associated with the categorical data field in the at least one historical transaction record, wherein determining the data quality score comprises determining the data quality score for the categorical data field based on the percentage.

Clause 18: A system for monitoring and improving data quality of transaction data, comprising: at least one processor programmed or configured to: receive transaction data associated with a plurality of payment transactions from an acquirer system, the transaction data comprising a transaction record associated with each payment transaction of the plurality of payment transactions, each transaction record comprising a plurality of data fields; categorize each respective data field of the plurality of data fields into a respective type of a plurality of types; and determine a data quality score for each respective data field of the plurality of data fields based on the respective type of the respective data field.

Clause 19: The system of clause 18, wherein a first data field of the plurality of data fields comprises a textual data field, wherein the at least one processor is further programmed or configured to: conduct data pre-processing on transaction data associated with a plurality of payment transactions received from an acquirer; determine feature values associated with a textual data field in each transaction record of a plurality of transaction records included in the transaction data associated with the plurality of payment transactions, wherein the feature values are used in a parsing layer of a natural language processing (NLP) model after conducting data pre-processing on the transaction data associated with the plurality of payment transactions; determine whether the feature values associated with the textual data field satisfy at least one rule associated with the parsing layer of the NLP model; determine a data quality score for each textual data field of each transaction record of the plurality of transaction records included in the transaction data based on determining whether the feature values associated with the textual data fields satisfy the at least one rule associated with the parsing layer of the NLP model; determine whether textual data located in a first textual data field of a first transaction record included in the plurality of transaction records corresponds to a specified stop-word; determine a lowest value of a data quality score for the textual data located in the first textual data field based on determining that the textual data located in the first textual data field of the first transaction record corresponds to the specified stop-word; and assign the lowest value of the data quality score to the textual data located in the first textual data field.

Clause 20: The system of clauses 18 or 19, wherein, when conducting the data pre-processing, the at least one processor is programmed or configured to: perform a text cleaning process on textual data located in a first textual data field of a first transaction record to produce cleaned textual data; and store a value that includes the cleaned textual data in a first modified textual data field associated with the first transaction record.

Clause 21: The system of any one of clauses 18-20, wherein, when performing the text cleaning process, the at least one processor is programmed or configured to: change upper case alphabetical characters to lower case alphabetical characters in the textual data located in the first textual data field of the first transaction record; and remove specified characters from the textual data located in the first textual data field of the first transaction record, wherein the specified characters include at least one of the following: a number character, an empty character space, a hash code character, a punctuation character, or any combination thereof.

Clause 22 The system of any one of clauses 18-21, wherein, when conducting the data pre-processing, the at least one processor is programmed or configured to: extract a root of a word that is included in textual data located in a first textual data field of a first transaction record; and store a value that includes the root of the word in a first modified textual data field associated with the first transaction record.

Clause 23: The system of any one of clauses 18-22, wherein the at least one processor is further programmed or configured to: determine whether textual data located in a first textual data field of a first transaction record corresponds to a historical textual description; and determine a data quality score for the textual data located in the first textual data field based on determining that the textual data located in the first textual data field of the first transaction record corresponds to the historical textual description.

Clause 24: The system of any one of clauses 18-23, wherein, when determining the data quality score for the textual data located in the first textual data field, the at least one processor is programmed or configured to: determine the data quality score for the textual data located in the first textual data field based on a level of correspondence between the textual data located in the first textual data field of the first transaction record and the historical textual description.

Clause 25: A computer program product for monitoring and improving data quality of transaction data, comprising at least one non-transitory computer-readable medium including one or more instructions that, when executed by at least one processor, cause the at least one processor to: receive transaction data associated with a plurality of payment transactions from an acquirer system, the transaction data comprising a transaction record associated with each payment transaction of the plurality of payment transactions, each transaction record comprising a plurality of data fields; categorize each respective data field of the plurality of data fields into a respective type of a plurality of types; and determine a data quality score for each respective data field of the plurality of data fields based on the respective type of the respective data field.

Clause 26: The computer program product of clause 25, wherein the one or more instructions further cause the at least one processor to: conduct data pre-processing on transaction data associated with a plurality of payment transactions received from an acquirer; determine feature values associated with a textual data field in each transaction record of a plurality of transaction records included in the transaction data associated with the plurality of payment transactions, wherein the feature values are used in a parsing layer of a natural language processing (NLP) model after conducting data pre-processing on the transaction data associated with the plurality of payment transactions; determine whether the feature values associated with the textual data field satisfy at least one rule associated with the parsing layer of the NLP model; and determine a data quality score for each textual data field of each transaction record of the plurality of transaction records included in the transaction data based on determining whether the feature values associated with the textual data fields satisfy the at least one rule associated with the parsing layer of the NLP model.

Clause 27: The computer program product of clauses 25 or 26, wherein the one or more instructions that cause the at least one processor to conduct the data pre-processing cause the at least one processor to: perform a text cleaning process on textual data located in a first textual data field of a first transaction record to produce cleaned textual data; and store a value that includes the cleaned textual data in a first modified textual data field associated with the first transaction record.

Clause 28: The computer program product of any one of clauses 25-27, wherein the one or more instructions that cause the at least one processor to perform the text cleaning process cause the at least one processor to: change upper case alphabetical characters to lower case alphabetical characters in the textual data located in the first textual data field of the first transaction record; and remove specified characters from the textual data located in the first textual data field of the first transaction record, wherein the specified characters include at least one of the following: a number character, an empty character space, a hash code character, a punctuation character, or any combination thereof.

Clause 29: The computer program product of any one of clauses 25-28, wherein the one or more instructions that cause the at least one processor to conduct the data pre-processing cause the at least one processor to: extract a root of a word that is included in textual data located in a first textual data field of a first transaction record; and store a value that includes the root of the word in a first modified textual data field associated with the first transaction record.

Clause 30: The computer program product of any one of clauses 25-29, wherein the one or more instructions further cause the at least one processor to: determine whether textual data located in a first textual data field of a first transaction record corresponds to a specified stop-word; determine a lowest value of a data quality score for the textual data located in the first textual data field based on determining that the textual data located in the first textual data field of the first transaction record corresponds to the specified stop-word; and assign the lowest value of the data quality score to the textual data located in the first textual data field.

Clause 31: The computer program product of any one of clauses 25-30, wherein the one or more instructions further cause the at least one processor to: determine whether textual data located in a first textual data field of a first transaction record corresponds to a historical textual description; and determine a data quality score for the textual data located in the first textual data field based on determining that the textual data located in the first textual data field of the first transaction record corresponds to the historical textual description.

Clause 32: The computer program product of any one of clauses 25-31, wherein the one or more instructions that cause the at least one processor to determine the data quality score for the textual data located in the first textual data field cause the at least one processor to: determine the data quality score for the textual data located in the first textual data field based on a level of correspondence between the textual data located in the first textual data field of the first transaction record and the historical textual description.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
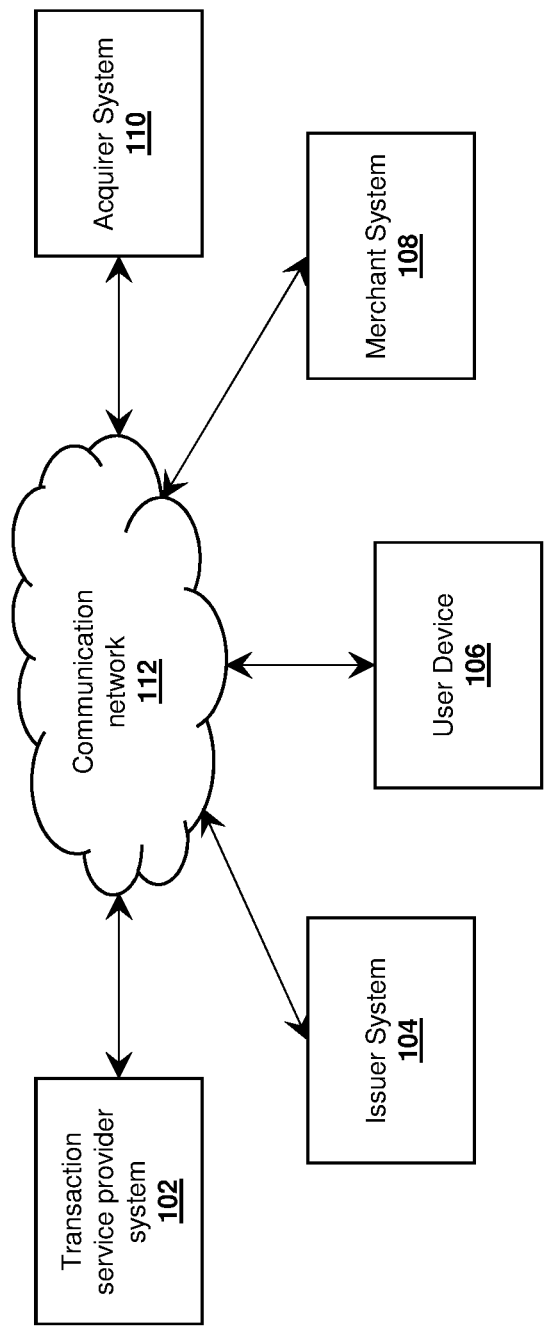
FIG. 1 is a diagram of a non-limiting embodiment of an environment in which systems, devices, products, apparatuses, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions such as such as credit payment transactions and/or debit payment transactions. For example, an issuer institution may provide an account identifier, such as a primary account number (PAN), to a customer that uniquely identifies one or more accounts associated with that customer. In some non-limiting embodiments, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may include one or more types of identifiers associated with an account (e.g., a PAN associated with an account, a card number associated with an account, a payment card number associated with an account, a token associated with an account, and/or the like). In some non-limiting embodiments, an issuer may provide an account identifier (e.g., a PAN, a token, and/or the like) to a user (e.g., an account holder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments, the account identifier may be an original account identifier, where the original account identifier was provided to a user at the creation of the account associated with the account identifier. In some non-limiting embodiments, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier of an account that is used as a substitute or replacement for another account identifier, such as a PAN. Tokens may be associated with a PAN or other original account identifier in one or more data structures (e.g., one or more databases) such that they may be used to conduct a payment transaction without directly using an original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods, services, and/or access to goods and/or services, to a user (e.g., a customer, a consumer, and/or the like) based on a transaction such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more electronic devices, which may be used by a merchant to conduct a transaction (e.g., a payment transaction) and/or process a transaction. Additionally or alternatively, a POS device may include peripheral devices, card readers, scanning devices (e.g., code scanners and/or the like), Bluetooth® communication receivers, near-field communication (NFC) receivers, radio frequency identification (RFID) receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. In some non-limiting embodiments, a transaction service provider may include a credit card company, a debit card company, a payment network such as Visa®, MasterCard®, AmericanExpress®, or any other entity that processes transaction. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the term "payment device" may refer to a payment card (e.g., a credit or debit card), a gift card, a smart card (e.g., a chip card, an integrated circuit card, and/or the like), smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the term "computing device" may refer to one or more electronic devices (e.g., processors, storage devices, and/or similar computer components) that are configured to directly or indirectly communicate with or over one or more networks. In some non-limiting embodiments, a computing device may include a mobile device. A mobile device may include a smartphone, a portable computer, a wearable device (e.g., watches, glasses, lenses, clothing, and/or the like), a personal digital assistant (PDA), and/or other like devices. In some non-limiting embodiments, a computing device may include a server, a desktop computer, and/or the like.

As used herein, the terms "client" and "client device" may refer to one or more computing devices that access a service made available by a server. In some non-limiting embodiments, a "client device" may refer to one or more devices that facilitate payment transactions, such as one or more POS devices used by a merchant. In some non-limiting embodiments, a client device may include a computing device configured to communicate with one or more networks and/or facilitate payment transactions such as, but not limited to, one or more desktop computers, one or more mobile devices, and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices that communicate with client devices and/or other computing devices over a communication network and/or, in some examples, facilitate communication among other computing devices and/or client devices.

As used herein, the term "system" may refer to one or more combinations of computing devices. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

In some non-limiting embodiments, systems, computer-implemented methods, and computer program products for monitoring and improving data quality of transaction data are disclosed. For example, in some non-limiting embodiments, transaction data including a transaction record associated with each payment transaction of a plurality of payment transactions may be received and each respective data field may be categorized into a respective type (e.g., of a plurality of types) so that a data quality score for each respective data field may be determined based on the respective type. In this way, embodiments of the present disclosure are effective at insuring that transaction messages associated with payment transactions contain values that allow for processing of the payment transaction and/or that allow for processing the payment transactions in an efficient amount of time (e.g., without errors caused by missing and/or incorrect values). In addition, embodiments of the present disclosure are effective at allowing for the construction of a database (e.g., an accurate database without missing and/or incorrect values) based on transaction data included in the transaction messages associated with the payment transactions. Further, embodiments of the present disclosure are effective at enabling automated determination of data quality without manual review by and/or manual interaction with users (e.g., subject matter experts (SMEs) and/or the like). Additionally, embodiments of the present disclosure are effective at enabling automated determination of data quality even if ordering and/or formatting of data is unknown (e.g., data fields having an unexpected ordering, data within at least some data fields not being formatted in an expected way, and/or the like).

Referring now to FIG. 1, FIG. 1 is a diagram of an example environment 100 in which devices, systems, methods, and/or products described herein may be implemented.

As shown in FIG. 1, environment 100 may include transaction service provider system 102, issuer system 104, user device 106, merchant system 108, acquirer system 110, and/or communication network 112. In some non-limiting embodiments, merchant system 108, transaction service provider system 102, acquirer system 110, issuer system 104, and user device 106 may interconnect (e.g., establish a connection to communicate, and/or the like) via wired connections, wireless connections, or a combination of wired and wireless connections (e.g., at least one communication network 112 and/or the like).

Transaction service provider system 102 may include one or more devices capable of being in communication with merchant system 108, acquirer system 110, issuer system 104, and/or user device 106 via communication network 112. For example, transaction service provider system 102 may include a server (e.g., a transaction processing server), a group of servers (e.g., a group of transaction processing servers), and/or other like devices. In some non-limiting embodiments, transaction service provider system 102 may be associated with a transaction service provider, as described herein.

Issuer system 104 may include one or more devices capable of being in communication with merchant system 108, transaction service provider system 102, acquirer system 110, and/or user device 106 via communication network 112. For example, issuer system 104 may include one or more computing devices, such as one or more servers, and/or other like devices. In some non-limiting embodiments, issuer system 104 may be associated with an issuer institution that issued a payment account and/or instrument (e.g., a credit account, a debit account, a credit card, a debit card, and/or the like) to a customer.

User device 106 may include one or more devices capable of being in communication with merchant system 108, transaction service provider system 102, acquirer system 110, and/or issuer system 104 via communication network 112. For example, user device 106 may include one or more computing devices, such as one or more mobile devices, one or more smartphones, one or more wearable devices, one or more servers, and/or the like. In some non-limiting embodiments, user device 106 may communicate via a short-range wireless communication connection. In some non-limiting embodiments, user device 106 may be associated with a customer as described herein.

Merchant system 108 may include one or more devices capable of being in communication with transaction service provider system 102, acquirer system 110, issuer system 104, and user device 106 via communication network 112. For example, merchant system 108 may include one or more payment devices, one or more computing devices, such as one or more mobile devices, one or more smartphones, one or more wearable devices (e.g., watches, glasses, lenses, clothing, and/or the like), one or more PDAs, one or more servers, and/or the like. In some non-limiting embodiments, merchant system 108 may communicate via a short-range wireless communication connection (e.g., a wireless communication connection for communicating information in a range between 2 to 3 centimeters to 5 to 6 meters, such as an NFC communication connection, an RFID communication connection, a Bluetooth® communication connection, and/or the like). In some non-limiting embodiments, merchant system 108 may be associated with a merchant, as described herein.

Acquirer system 110 may include one or more devices capable of being in communication with merchant system 108, transaction service provider system 102, issuer system 104, and/or user device 106 via communication network 112. For example, acquirer system 110 may include one or more computing devices, such as one or more servers, and/or other like devices. In some non-limiting embodiments, acquirer system 110 may be associated with an acquirer, as described herein.

Communication network 112 may include one or more wired and/or wireless networks. For example, communication network 112 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

In some non-limiting embodiments, processing a transaction may include generating and/or communicating at least one transaction message (e.g., authorization request, authorization response, any combination thereof, and/or the like). For example, a client device (e.g., user device 106, a POS device of merchant system 108, and/or the like) may initiate the transaction, e.g., by generating an authorization request. Additionally or alternatively, the client device (e.g., user device 106, at least on device of merchant system 108, and/or the like) may communicate the authorization request. For example, user device 106 may communicate the authorization request to merchant system 108 and/or a payment gateway (e.g., a payment gateway of transaction service provider system 102, a third-party payment gateway separate from transaction service provider system 102, and/or the like). Additionally or alternatively, merchant system 108 (e.g., a POS device thereof) may communicate the authorization request to acquirer system 110 and/or a payment gateway. In some non-limiting embodiments, acquirer system 110 and/or a payment gateway may communicate the authorization request to transaction service provider system 102 and/or issuer system 104. Additionally or alternatively, transaction service provider system 102 may communicate the authorization request to issuer system 104. In some non-limiting embodiments, issuer system 104 may determine an authorization decision (e.g., authorize, decline, and/or the like) based on the authorization request. For example, the authorization request may cause issuer system 104 to determine the authorization decision based thereof. In some non-limiting embodiments, issuer system 104 may generate an authorization response based on the authorization decision. Additionally or alternatively, issuer system 104 may communicate the authorization response. For example, issuer system 104 may communicate the authorization response to transaction service provider system 102 and/or a payment gateway. Additionally or alternatively, transaction service provider system 102 and/or a payment gateway may communicate the authorization response to acquirer system 110, merchant system 108, and/or user device 106. Additionally or alternatively, acquirer system 110 may communicate the authorization response to merchant system 108 and/or a payment gateway. Additionally or alternatively, a payment gateway may communicate the authorization response to merchant system 108 and/or user device 106. Additionally or alternatively, merchant system 108 may communicate the authorization response to user device 106. In some non-limiting embodiments, merchant system 108 may receive (e.g., from acquirer system 110 and/or a payment gateway) the authorization response. Additionally or alternatively, merchant system 108 may complete the transaction based on the authorization response (e.g., provide, ship, and/or deliver goods and/or services associated with the transaction; fulfill an order associated with the transaction; any combination thereof; and/or the like).

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
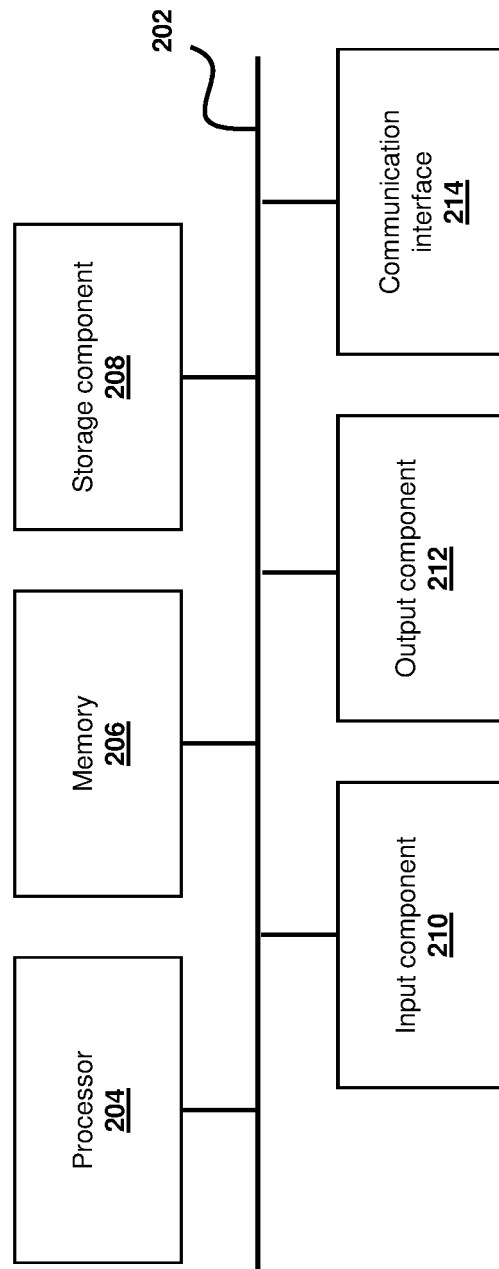
FIG. 2 is a diagram of a non-limiting embodiment of components of one or more devices of FIG. 1.

Referring now to FIG. 2, FIG. 2 is a diagram of example components of a device 200. Device 200 may correspond to transaction service provider system 102, and/or one or more devices of issuer system 104, user device 106, and/or merchant system 108. In some non-limiting embodiments, transaction service provider system 102, issuer system 104, user device 106, and/or merchant system 108 may include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
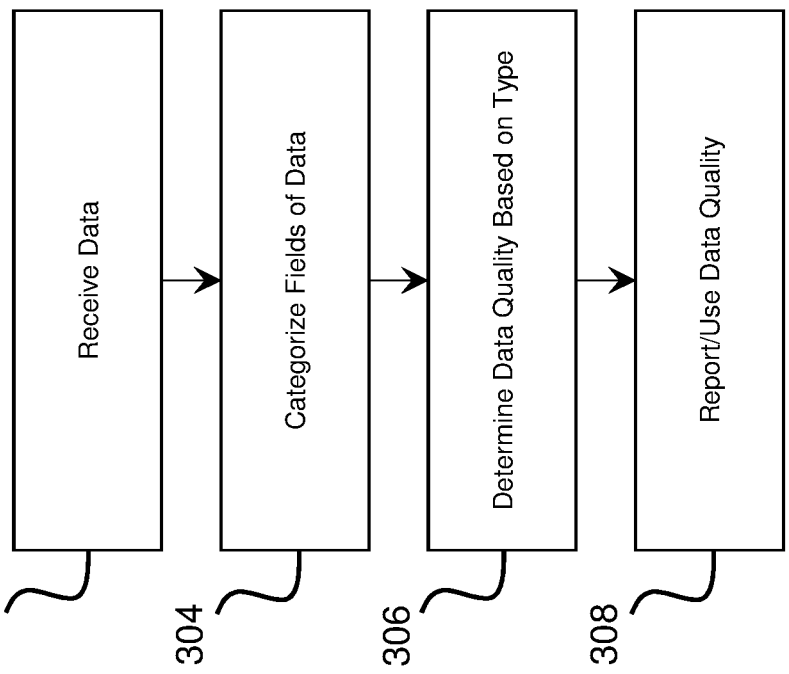
FIG. 3 is a flowchart of a non-limiting embodiment of a process for monitoring and improving data quality of transaction data according to the principles of the presently disclosed subject matter.

Referring now to FIG. 3, FIG. 3 is a flowchart of a non-limiting embodiment of a process 300 for monitoring and improving data quality of transaction data. In some non-limiting embodiments, one or more of the steps of process 300 may be performed (e.g., completely, partially, and/or the like) by transaction service provider system 102 (e.g., one or more devices of transaction service provider system 102). In some non-limiting embodiments, one or more of the steps of process 300 may be performed (e.g., completely, partially, and/or the like) by another system, another device, another group of systems, or another group of devices, separate from or including transaction service provider system 102, such as issuer system 104 (e.g., one or more devices of issuer system 104), user device 106, merchant system 108 (e.g., one or more devices of merchant system 108), acquirer system 110 (e.g., one or more devices of acquirer system 110), any combination thereof, and/or the like.

As shown in FIG. 3, at step 302, process 300 may include receiving data. For example, transaction data associated with a plurality of payment transactions may be received by transaction service provider system 102. In some non-limiting embodiments, transaction service provider system 102 may receive transaction data (e.g., historical transaction data, first transaction data, first historical transaction data, and/or the like) associated with a plurality of payment transactions involving (e.g., conducted by) a user, a plurality of users, and/or the like. In some non-limiting embodiments, the transaction data may be associated with a plurality of payment transactions involving one or more accounts (e.g., a credit card account, a debit card account, and/or the like) of a user, a plurality of accounts of a plurality of users, and/or the like.

In some non-limiting embodiments, transaction service provider system 102 may receive transaction data associated with a plurality of payment transactions from acquirer system 110 (e.g., via communications network 112). Additionally or alternatively, transaction service provider system 102 may receive (e.g., via communications network 112) transaction data from another system, another device, another group of systems, or another group of devices, separate from or including acquirer 110, such as issuer system 104, user device 106, merchant system 108, and/or the like.

In some non-limiting embodiments, the transaction data may include a transaction record associated with each payment transaction of the plurality of payment transactions. Additionally or alternatively, each transaction record may include a plurality of data fields.

In some non-limiting embodiments, transaction service provider system 102 may receive transaction data associated with a plurality of payment transactions conducted within a predetermined time interval of (e.g., within a predetermined time interval of 30 days from, and/or the like) activation of an account (e.g., a debit account, a credit account, a debit card account, a credit card account, and/or the like) involved in the plurality of payment transactions. For example, transaction service provider system 102 may receive the transaction data associated with the plurality of payment transactions conducted within the predetermined time interval of activation of the account (e.g., a debit account, a credit account, a debit card account, a credit card account, and/or the like) where the plurality of payment transactions involves a user associated with the account.

In some non-limiting embodiments, transaction service provider system 102 may receive the transaction data from issuer system 104 and/or merchant system 108 (e.g., via communications network 112). For example, transaction service provider system 102 may receive the transaction data from merchant system 108 via communications network 112 in real-time while a payment transaction is being conducted, after a payment transaction has been authorized, after a payment transaction has been cleared, and/or after a payment transaction has been settled. In some non-limiting embodiments, historical transaction data may include transaction data associated with one or more payment transactions that have been authorized, cleared, and/or settled.

In some non-limiting embodiments, the transaction data may be associated with a payment transaction (e.g., a payment transaction of a plurality of payment transactions) and/or a plurality of payment transactions. For example, the transaction data may be associated with a payment transaction involving a user and a merchant (e.g., a merchant associated with merchant system 108). In some non-limiting embodiments, the plurality of payment transactions may involve a plurality of users and a plurality of merchants and each payment transaction of the plurality of payment transactions may involve a single user and a single merchant.

In some non-limiting embodiments, the transaction data associated with a payment transaction may include transaction amount data associated with an amount of the payment transaction (e.g., a cost associated with the payment transaction, a transaction amount, an overall transaction amount, a cost of one or more products involved in the payment transaction, and/or the like), transaction time data associated with a time interval at which the payment transaction occurred (e.g., a time of day, a day of the week, a day of a month, a month of a year, a predetermined time of day segment such as morning, afternoon, evening, night, and/or the like, a predetermined day of the week segment such as weekday, weekend, and/or the like, a predetermined segment of a year such as first quarter, second quarter, and/or the like), transaction type data associated with a transaction type of the payment transaction (e.g., an online transaction, a card present transaction, a face-to-face transaction, and/or the like), and/or the like.

Additionally or alternatively, the transaction data may include user transaction data associated with the user involved in the payment transaction, merchant transaction data associated with the merchant involved in the payment transaction, and/or issuer institution transaction data associated with an issuer institution of an account involved in the payment transaction. In some non-limiting embodiments, user transaction data may include user identity data associated with an identity of the user (e.g., a unique identifier of the user, a name of the user, and/or the like), user account data associated with an account of the user (e.g., an account identifier associated with the user, a PAN associated with a credit and/or debit account of the user, a token associated with a credit and/or debit account of the user, and/or the like), and/or the like.

In some embodiments, merchant transaction data may include merchant identity data associated with an identity of the merchant (e.g., a unique identifier of the merchant, a name of the merchant, and/or the like), merchant category data associated with at least one merchant category of the merchant (e.g., a code for a merchant category, a name of a merchant category, a type of a merchant category, and/or the like), merchant account data associated with an account of the merchant (e.g., an account identifier associated with an account of the merchant, a PAN associated with an account of the merchant, a token associated with an account of the merchant, and/or the like), and/or the like.

In some embodiments, issuer institution transaction data may include issuer institution identity data associated with the issuer institution that issued an account involved in the payment transaction (e.g., a unique identifier of the issuer institution, a name of the issuer institution, an issuer identification number (IIN) associated with the issuer institution, a BIN associated with the issuer institution, and/or the like), and/or the like.

In some non-limiting embodiments, transaction data associated with a payment transaction (e.g., each payment transaction of a plurality of payment transactions) may identify a merchant category of a merchant involved in the payment transaction. For example, transaction data associated with the payment transaction may include merchant transaction data that identifies a merchant category of a merchant involved in the payment transaction. A merchant category may be information that is used to classify the merchant based on the type of goods or services the merchant provides. In some non-limiting embodiments, a payment transaction may involve a merchant that is associated with a merchant category of a plurality of merchant categories.

In some non-limiting embodiments, transaction data associated with a payment transaction may identify a time (e.g., a time of day, a day, a week, a month, a year, a predetermined time interval, and/or the like) at which the payment transaction occurred. For example, the transaction data associated with the payment transaction may include transaction time data that identifies a time interval at which the payment transaction occurred.

As shown in FIG. 3, at step 304, process 300 may include categorizing fields of the data. For example, transaction service provider system 102 may categorize each respective data field of the transaction records into a respective type of a plurality of types.

In some non-limiting embodiments, transaction service provider system 102 may select a subset of the plurality of data fields based on an application. Additionally or alternatively, categorizing may include transaction service provider system 102 categorizing each respective data field of the subset into the respective type of the plurality of types. For example, an application may require a subset of the plurality of data fields as input. Additionally or alternatively, transaction service provider system 102 may select (e.g., extract, identify, and/or the like) only the subset of the data fields for further processing (e.g., categorization, determination of data quality, reporting/using, and/or the like) and disregard the other data fields. For example, transaction service provider system 102 may categorize each respective data field of the subset into the respective type (e.g., and disregard the other data fields).

In some non-limiting embodiments, the types may include a date type, a categorical type, an identifier type, a textual type, a numeric type, any combination thereof, and/or the like. Additionally or alternatively, categorizing may include transaction service provider system 102 categorizing each respective data field into one of the date type, the categorical type, the identifier type, the textual type, or the numeric type.

In some non-limiting embodiments, transaction service provider system 102 may categorize each respective data field based on at least one rule associated with each type. Additionally or alternatively, transaction service provider system 102 may prioritize certain types (e.g., the rules thereof) over others during categorization. For example, transaction service provider system 102 may categorize a respective data field into the date type if at least one of: data contained in the respective data field is formatted as at least one of a standard date format, a standard time format, a standard date and time format, any combination thereof, and/or the like; data contained in the respective data field satisfies at least one of a date function, a time function, a date and time function, any combination thereof, and/or the like; any combination thereof; and/or the like. If the respective data field is not categorized into the date type, transaction service provider system 102 may categorize the respective data field into the categorical type based on a statistical distribution of values in the data contained in the respective data field and a threshold of unique values. If the respective data field is not categorized into the date type or the categorical type, transaction service provider system 102 may categorize the respective data field into the identifier type based on a degree of uniqueness of the values in the data contained in the respective data field. If the respective data field is not categorized into the date type, the categorical type, or the identifier type, transaction service provider system 102 may categorize the respective data field into the textual type based on at least one of a plurality of regular expression functions; a number of combinations of punctuation, alphabetical characters, and/or digits of the data contained in the respective data field; any combination thereof; and/or the like. If the respective data field is not categorized into the date type, the categorical type, the identifier type, or the textual type, transaction service provider system 102 may categorize the respective data field into the numeric type if the data contained in the respective data field includes only digits and up to one decimal point.

In some non-limiting embodiments, categorizing may include transaction service provider system 102 categorizing each respective data field as described below with respect to FIG. 5.

As shown in FIG. 3, at step 306, process 300 may include determining data quality based on the type (e.g., type of data field(s)). For example, transaction service provider system 102 may determine a data quality score for each respective data field of the plurality of data fields based on the respective type of the respective data field.

In some non-limiting embodiments, for a data field that is a textual data field (e.g., data field categorized into the textual type), transaction service provider system 102 may conduct data pre-processing on the transaction data. In some non-limiting embodiments, conducting the data pre-processing may include transaction service provider system 102 performing a text cleaning process on textual data located in a first textual data field of a first transaction record to produce cleaned textual data and storing a value that includes the cleaned textual data in a first modified textual data field associated with the first transaction record. For example, the text cleaning process comprises may include changing upper case alphabetical characters to lower case alphabetical characters in the textual data located in the first textual data field of the first transaction record and/or removing specified characters from the textual data located in the first textual data field of the first transaction record. Additionally or alternatively, the specified characters may include at least one of the following: a number character, an empty character space, a hash code character, a punctuation character, any combination thereof, and/or the like. In some non-limiting embodiments, conducting the data pre-processing may include transaction service provider system 102 extracting a root of a word that is included in textual data located in a first textual data field of a first transaction record and storing a value that includes the root of the word in a first modified textual data field associated with the first transaction record.

In some non-limiting embodiments, transaction service provider system 102 may determine feature values associated with the textual data field in each transaction record. Additionally or alternatively, the feature values may be used in a parsing layer of an NLP model (e.g., implemented completely, partially, and/or the like by transaction service provider system 102) after conducting data pre-processing on the transaction data associated with the plurality of payment transactions.

In some non-limiting embodiments, transaction service provider system 102 may determine whether the feature values associated with the textual data field satisfy at least one rule associated with the parsing layer of the NLP model.

In some non-limiting embodiments, transaction service provider system 102 may determine a data quality score for each textual data field included in the transaction data based on determining whether the feature values associated with the textual data fields satisfy the at least one rule associated with the parsing layer of the NLP model.

In some non-limiting embodiments, transaction service provider system 102 may determine whether textual data located in a first textual data field of a first transaction record corresponds to a specified stop-word. Additionally or alternatively, transaction service provider system 102 may determine a lowest value of a data quality score for the textual data located in the first textual data field based on determining that the textual data located in the first textual data field of the first transaction record corresponds to the specified stop-word. Additionally or alternatively, transaction service provider 102 may assign the lowest value of the data quality score to the textual data located in the first textual data field.

In some non-limiting embodiments, transaction service provider 102 may determine whether textual data located in a first textual data field of a first transaction record corresponds to a historical textual description. Additionally or alternatively, transaction service provider 102 may determine a data quality score for the textual data located in the first textual data field based on determining that the textual data located in the first textual data field of the first transaction record corresponds to the historical textual description. In some non-limiting embodiments, determining the data quality score for the textual data located in the first textual data field may include transaction service provider 102 determining the data quality score for the textual data located in the first textual data field based on a level of correspondence between the textual data located in the first textual data field of the first transaction record and the historical textual description.

In some non-limiting embodiments, determining a data quality score for textual data may include transaction service provider system 102 determining a data quality score as described below with respect to FIG. 7.

In some non-limiting embodiments, for a subset of data fields that includes numeric data fields (e.g., data fields categorized into the numeric type), transaction service provider system 102 may generate a vector including a plurality of elements. Additionally or alternatively, the elements may include an element for each value of the numeric data fields and for each interaction of at least two values of the numeric data fields. In some non-limiting embodiments, interactions may include all possible arithmetic combinations of at least two elements of the vector. For example, interactions may include all possible multiplications of two elements (e.g., values) of the vector. For example, each interaction may include a multiplication of the value of a first numeric data field of the numeric data fields and the value of a second numeric data field of the numeric data fields.

In some non-limiting embodiments, transaction service provider system 102 may generate a plurality of tuples based on the plurality of elements. For example, each tuple may include a subset of a selected number (e.g., three, four, and/or the like) of elements of the plurality of elements of the vector. For example, the tuples may include all possible combinations of three elements from the vector.

In some non-limiting embodiments, transaction service provider system 102 may perform a regression (e.g., linear regression, a linear least squares regression, a polynomial regression, any combination thereof, and/or the like) on each tuple to provide an error value (e.g., least squares error, such as minimizing the sum of the squared deviations between the values of the numerical data fields (e.g., the values of the elements of the vector) and the model (e.g., regression model, curve, and/or the like)) for each tuple. Additionally or alternatively, transaction service provider system 102 may determine the error value of at least one tuple (e.g., of the plurality of tuples) satisfies a data quality threshold (e.g., selectable threshold value and/or the like). In some non-limiting embodiments, transaction service provider system 102 may store at least one of a coefficient value, an intercept value, or any combination thereof based on the regression for the at least one tuple that satisfies the data quality threshold.

In some non-limiting embodiments, determining a data quality score for numeric data may include transaction service provider system 102 determining a data quality score as described below with respect to FIG. 6.

In some non-limiting embodiments, for a subset of data fields that includes date data fields (e.g., data fields categorized into the date type), transaction service provider system 102 may detect a formatting of each date data field. For example, transaction service provider system 102 may detect whether a year is formatted as two or four digits, the position of the year with respect to other digits (e.g., day and/or month), the position of the month with respect to other digits (e.g., day and/or year), the position of the day with respect to other digits (e.g., month and/or year), presence of separators (e.g., dashes, hyphens, slashes, and/or the like), and/or the like. Additionally or alternatively, transaction service provider system 102 may determine a relationship distribution between each date data field and at least one other date data field. For example, processing date (e.g., delivery date) should be greater than or equal to order date, and/or the like. In some non-limiting embodiments, determining the data quality score may include transaction service provider system 102 determining the data quality score for each date data field based on the formatting and the relationship distribution.

In some non-limiting embodiments, for a data field that is an identifier data field (e.g., data field categorized into the identifier type), transaction service provider system 102 may determine that the identifier data associated with the identifier data field in each transaction record is unique from the identifier data associated with the textual data field in other transaction records of the transaction data. Additionally or alternatively, transaction service provider system 102 may determine that the identifier data associated with the identifier data field in each transaction record is unique from historical identifier data associated with the identifier data field in historical transaction records. For example, identifier data should not be repeated as such identifier data should be unique to the transaction record in which the identifier data is contained. In some non-limiting embodiments, identifier data from all historical transaction records may be separately stored in a compact format (e.g., to preserve memory resources, to enable quick checking (e.g., by reducing searching times), and/or the like).

In some non-limiting embodiments, for a data field that is a categorical data field (e.g., data field categorized into the categorical type), transaction service provider system 102 may determine the categorical data associated with the categorical data field in each transaction record matches historical categorical data associated with the categorical data field in at least one historical transaction record. Additionally or alternatively, transaction service provider system 102 may determine a percentage of transaction records for which the categorical data associated with the categorical data field therein matches the historical categorical data associated with the categorical data field in the at least one historical transaction record (e.g., over 99% matches and/or the like). In some non-limiting embodiments, determining the data quality score may include transaction service provider system 102 determining the data quality score for the categorical data field based on the percentage.

In some non-limiting embodiments, transaction service provider system 102 may determine an overall data quality score based on the data quality scores for each data field. For example, transaction service provider system 102 may determine the overall data quality score based on the transaction data, the data quality scores for each data field of the transaction data, any combination thereof, and/or the like.

In some non-limiting embodiments, transaction service provider system 102 may determine the overall data quality score based on an aggregation (e.g., average, weighted average, any combination thereof, and/or the like) of the data quality scores for each data field.

In some non-limiting embodiments, transaction service provider system 102 may generate at least one vector based on the transaction data, the data quality scores for each data field of the transaction data, any combination thereof, and/or the like. For example, transaction service provider system 102 may generate at least one vector based on the transaction data and/or the data quality scores being provided to at least one neural network (e.g., a deep neural network, a recurrent neural network (RNN), a long short-term memory (LSTM) network, any combination thereof, and/or the like). In some non-limiting embodiments, transaction service provider system 102 may generate a plurality of vectors (e.g., encoded vectors, embedding vectors, any combination thereof, and/or the like) based on the transaction data using a LSTM network. Additionally or alternatively, transaction service provider system 102 may combine (e.g., concatenate and/or the like) the plurality of vectors with the data quality scores for each data field of the transaction data and/or at least one data quality label (e.g., labels determined based on anomaly detection using the embedding vectors, labels determined based on heuristics, any combination thereof, and/or the like) to provide a combined vector. In some non-limiting embodiments, the combined vector may be provided as input to a classifier (e.g., at least one neural network, such as a deep neural network, an RNN, an LSTM network, any combination thereof, and/or the like) to generate (e.g., as output of the classifier) the overall data quality score.

As shown in FIG. 3, at step 308, process 300 may include reporting and/or using the data quality score. For example, transaction service provider system 102 may report and/or use the data quality scores for each data field of the transaction data and/or the overall data quality score. In some non-limiting embodiments, transaction service provider system 102 may display a graphical user interface (e.g., GUI) including an indication of at least one of the data quality scores for each data field of the transaction data, the overall data quality score, any combination thereof, and/or the like. Additionally or alternatively, transaction service provider system 102 may communicate a message including data quality score data associated with at least one of the data quality scores for each data field of the transaction data, the overall data quality score, any combination thereof, and/or the like. Additionally or alternatively, transaction service provider system 102 may generate an invoice based on at least one of the data quality scores for each data field of the transaction data, the overall data quality score, any combination thereof, and/or the like. For example, if the data quality (e.g., data quality scores for each data field of the transaction data and/or the overall data quality score) is insufficient (e.g., satisfies a threshold, is below a threshold, and/or the like) for Level 2 and/or Level 3 data, the invoice may indicate additional fees associated with a lower level (e.g., Level 1 and/or Level 2) for at least some of the transactions.

Figure 4:
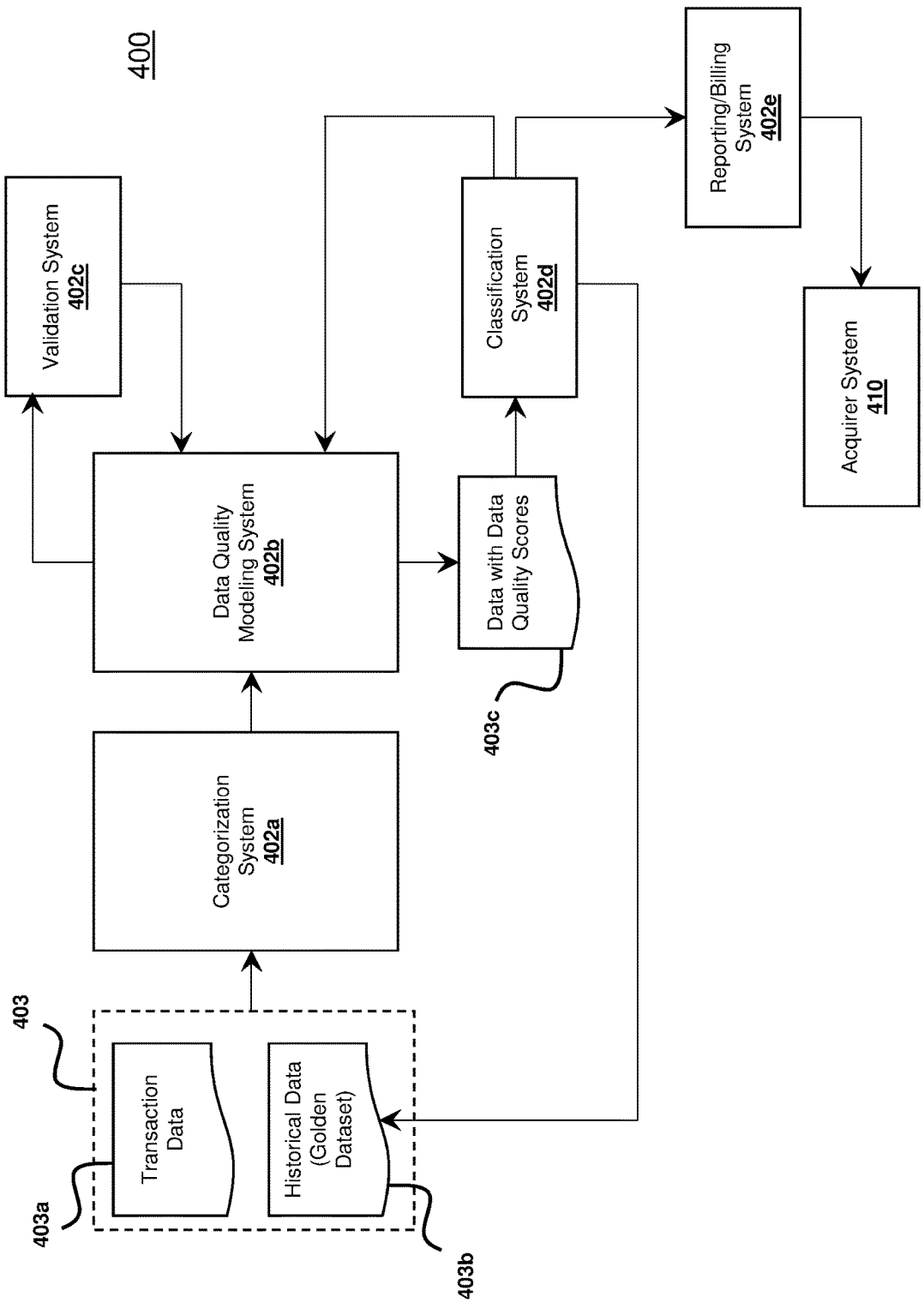
FIG. 4 is a diagram of a non-limiting embodiment of an implementation of a non-limiting embodiment of the process shown in FIG. 3 according to the principles of the presently disclosed subject matter.

Referring now to FIG. 4, FIG. 4 is a diagram of an exemplary implementation 400 of a non-limiting embodiment relating to process 300 shown in FIG. 3. As shown in FIG. 4, implementation 400 may include categorization system 402a, data quality modeling system 402b, validation system 402c, classification system 402d, reporting/billing system 402e, data 403 (e.g., transaction data 403a, historical data 403b, and/or data with data quality scores 403c), and/or acquirer system 410. In some non-limiting embodiments, categorization system 402a, data quality modeling system 402b, validation system 402c, classification system 402d, reporting/billing system 402e may be the same as, similar to, part of, and/or implemented by (e.g., completely, partially, and/or the like) transaction service provider system 102. In some non-limiting embodiments, acquirer system 410 may be the same as or similar to acquirer system 110. In some non-limiting embodiments, data 403 (e.g., transaction data 403a, historical data 403b, data with data quality scores 403c, any combination thereof, and/or the like) may be the same as or similar to the data (e.g., transaction data, historical transaction data, historical transaction records, data quality scores, any combination thereof, and/or the like) discussed with respect to FIG. 3.

In some non-limiting embodiments, categorization system 402a may receive data 403, as described herein. For example, categorization system 402a may receive transaction data 403a associated with a plurality of payment transactions and/or historical transaction data 403b associated with a plurality of historical payment transactions, as described herein. In some non-limiting embodiments, the transaction data may include a transaction record associated with each payment transaction of the plurality of payment transactions. Additionally or alternatively, each transaction record may include a plurality of data fields.

In some non-limiting embodiments, categorization system 402a may categorize fields of data 403, as described herein. For example, categorization system 402a may categorize each respective data field of the transaction records of transaction data 403a into a respective type of a plurality of types, as described herein. For example, the types may include a date type, a categorical type, an identifier type, a textual type, a numeric type, any combination thereof, and/or the like, as described herein.

In some non-limiting embodiments, data quality modeling system 402b may determine data quality based on the type (e.g., type of data field(s)), as described herein. For example, data quality modeling system 402b may determine a data quality score for each respective data field of the plurality of data fields of the transaction records of transaction data 403a based on the respective type of the respective data field, as described herein.

In some non-limiting embodiments, data quality modeling system 402b may output the data quality scores (e.g., data with data quality scores 403c and/or the like). Additionally or alternatively, the data quality scores (e.g., data with data quality scores 403c and/or the like) may be received by validation system 402c and/or classification system 402d.

In some non-limiting embodiments, validation system 402c may provide access for a user (e.g., SME and/or the like) to review at least one data quality score and/or transaction data 403a associated therewith. For example, validation system 402c may generate a GUI including an indication of at least one of the transaction data (e.g., at least one field thereof), the data quality scores for at least one field of the transaction data, any combination thereof, and/or the like. Additionally or alternatively, validation system 402c may enable the user to adjust at least one model for at least one type of data in data quality modeling system 402b, as described herein.

In some non-limiting embodiments, classification system 402d may determine an overall data quality score based on the transaction data, the data quality scores for each data field of the transaction data, any combination thereof, and/or the like, as described herein. In some non-limiting embodiments, e.g., if the overall data quality score and/or the data quality scores for each data field of the transaction data satisfy at least one threshold, classification system 402d may add at least one transaction record associated with such overall data quality score and/or data quality scores to historical data 403b. In some non-limiting embodiments, classification system 402d may communicate the data quality scores for each data field of the transaction data and/or the overall data quality score to reporting/billing system 402e.

In some non-limiting embodiments, reporting/billing system 402e may report and/or use the data quality score(s), as described herein. For example, reporting/billing system 402e may report and/or use the data quality scores for each data field of the transaction data and/or the overall data quality score, as described herein. For example, reporting/billing system 402e may display a GUI including an indication of at least one of the data quality scores for each data field of the transaction data, the overall data quality score, any combination thereof, and/or the like. Additionally or alternatively, reporting/billing system 402e may communicate a message (e.g., a report, an invoice, and/or the like) including data quality score data associated with at least one of the data quality scores for each data field of the transaction data, the overall data quality score, any combination thereof, and/or the like, e.g., to acquirer system 410, as described herein.

Figure 5:
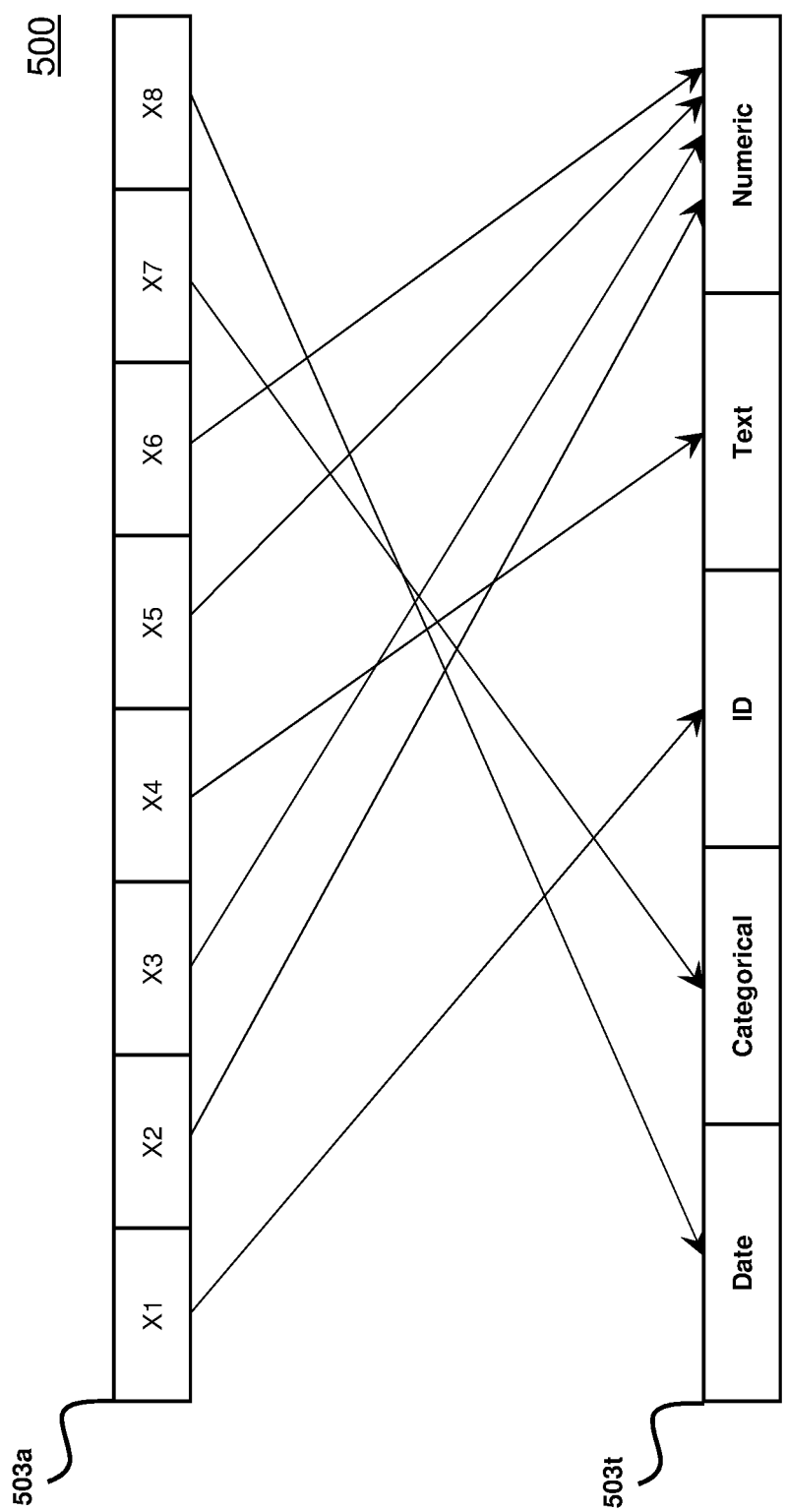
FIG. 5 is a diagram of a non-limiting embodiment of an implementation of a non-limiting embodiment of the process shown in FIG. 3 according to the principles of the presently disclosed subject matter.

Referring now to FIG. 5, FIG. 5 is a diagram of an exemplary implementation 500 of a non-limiting embodiment relating to process 300 shown in FIG. 3. As shown in FIG. 5, implementation 500 may be implemented (e.g., completely, partially, and/or the like) by transaction service provider system 102 and/or classification system 402a.

As shown in FIG. 5, transaction record 503a may include eight data fields, X1-X8 (e.g., eight data fields in total, a subset of eight data fields selected from a larger set of data fields based on data fields required as input by an application, and/or the like), as described herein. Additionally, types 503t may include five types: a date type ("Date"), a categorical type ("Categorical"), an identifier type ("ID"), a textual type ("Text"), a numeric type ("Numeric"), as described herein.

In some non-limiting embodiments, a system (e.g., transaction service provider system 102, categorization system 402a, and/or the like) may categorize each respective data field X1-X8 of transaction record 503a based on at least one rule associated with each type 503t, as described herein. Additionally or alternatively, the system may prioritize certain types (e.g., the rules thereof) over others during categorization, as described herein. For example, the system may prioritize the types in the following order: Date, Categorical, ID, Text, and Numeric.

In some non-limiting embodiments, a system (e.g., transaction service provider system 102, categorization system 402a, and/or the like) may categorize a data field (e.g., data field X8) into the date type if at least one of: data contained in the respective data field is formatted as at least one of a standard date format, a standard time format, a standard date and time format, any combination thereof, and/or the like; data contained in the respective data field satisfies at least one of a date function, a time function, a date and time function, any combination thereof, and/or the like; any combination thereof; and/or the like, as described herein. For example, the system may apply date, time, and/or date and time functions on data field X8 and check whether a validity percentage associated with such functions satisfies a threshold. In some non-limiting embodiments, examples of date type data fields may include Central Processing Date (CPD) (e.g., 01012020), file date (e.g., 20200112), purchase date (e.g., 011219), and/or the like.

If a data field (e.g., data field X7) is not categorized into the date type, a system (e.g., transaction service provider system 102, categorization system 402a, and/or the like) may categorize data field X7 into the categorical type based on a statistical distribution of values in the data contained in the respective data field and a threshold of unique values, as described herein. For example, the system may categorize data field X7 into the categorical type based on the statistical distribution of values (e.g., finite values and/or the like) in data field X7 across the dataset (e.g., in all transaction records in the transaction data) and a threshold (e.g., selectable threshold, configurable threshold, and/or the like) of unique values when compared to a whole set of transaction records. In some non-limiting embodiments, examples of categorical type data fields may include a discount amount sign (e.g., +, −), a foreign amount sign (e.g., C, D), a discount indicator (e.g., 0, 1, 2, 3, 4), and/or the like.

If a data field (e.g., data field X1) is not categorized into the date type or the categorical type, a system (e.g., transaction service provider system 102, categorization system 402a, and/or the like) may categorize data field X1 into the identifier type based on a degree of uniqueness of the values in the data contained in data field X1. For example, the system may categorize data field X1 into the identifier type based on a degree of uniqueness (e.g., an identifier value should not be repeated, or should be repeated less than a (selectable) threshold number of times, in the dataset) of data field X1. In some non-limiting embodiments, examples of identifier type data fields may include a message identifier (e.g., XX121091212), a transaction identifier (e.g., 3452983450), a record key (e.g., ad1234df, 12387490), and/or the like.

If a data field (e.g., data field X4) is not categorized into the date type, the categorical type, or the identifier type, a system (e.g., transaction service provider system 102, categorization system 402a, and/or the like) may categorize data field X4 into the textual type based on at least one of a plurality of regular expression functions; a number of combinations of punctuation, alphabetical characters, and/or digits of the data contained in data field X4; any combination thereof; and/or the like, as described herein. For example, the system may categorize data field X4 into the textual type based on regular expression functions (e.g., functions may be applied on data field X4 in each transaction record 503a of the dataset and the output of such functions may be analyzed programmatically). Additionally or alternatively, combinations of punctuation, alphabetical characters, and/or numerical digits may be used by the system to categorize data field X4 into the textual type (e.g., based on the number of combinations, based on not exclusively containing numeric digits, and/or the like). In some non-limiting embodiments, examples of textual type data fields may include an item description (e.g., 0.5 LB APPLE) and/or the like.

If any data fields (e.g., data fields X2, X3, X5, and X6) are not categorized into the date type, the categorical type, the identifier type, or the textual type, a system (e.g., transaction service provider system 102, categorization system 402a, and/or the like) may categorize data fields X2, X3, X5, and X6 into the numeric type if the data contained therein includes at least one digit and up to one decimal point. Additionally or alternatively, the system may categorize data fields X2, X3, X5, and X6 into the numeric type if the data contained therein allows for application of numeric functions. In some non-limiting embodiments, examples of textual type data fields may include item price (e.g., 0.21, 2.00), source amount (e.g., 49.2), quantity total (e.g., 2, 19), and/or the like.

Figure 6:
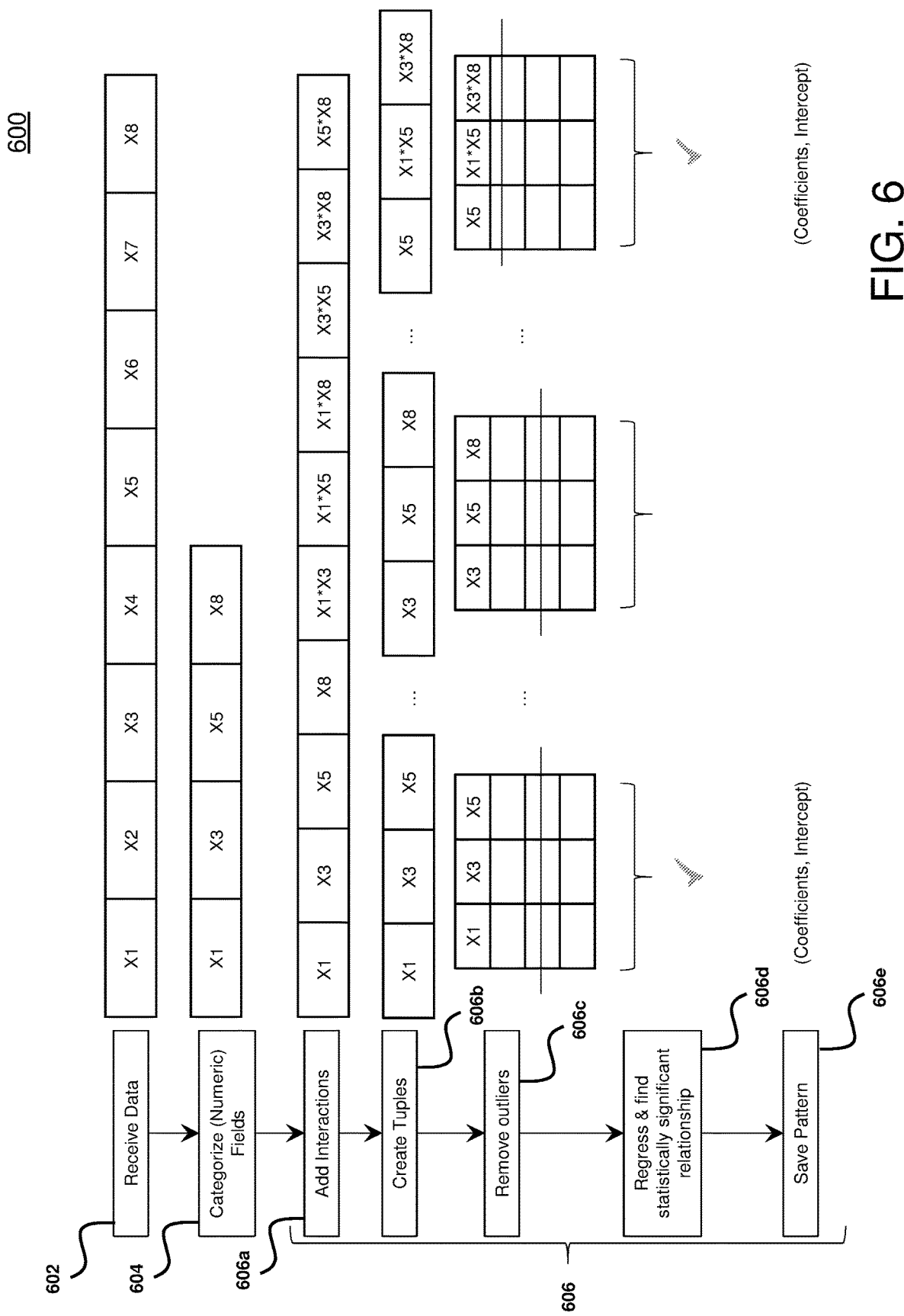
FIG. 6 is a diagram of a non-limiting embodiment of an implementation of a non-limiting embodiment of the process shown in FIG. 3 according to the principles of the presently disclosed subject matter.

Referring now to FIG. 6, FIG. 6 is a diagram of an exemplary implementation 600 of a non-limiting embodiment relating to process 300 shown in FIG. 3. As shown in FIG. 6, implementation 600 may be implemented (e.g., completely, partially, and/or the like) by transaction service provider system 102 and/or data quality modeling system 402b. In some non-limiting embodiments, implementation 600 may be implemented (e.g., completely, partially, and/or the like) by another system, another device, another group of systems, or another group of devices, separate from or including transaction service provider system 102 and/or data quality modeling system 402b, such as acquirer system 110, categorization system 402a, validation system 402c, classification system 402d, reporting/billing system 402e, acquirer system 410, any combination thereof, and/or the like.

As shown in FIG. 6, at step 602, implementation 600 may include receiving data, as described herein. For example, a system (e.g., transaction service provider system 102, categorization system 402a, and/or data quality modeling system 402b) may receive transaction data associated with a plurality of payment transactions, as described herein. For the purpose of illustration, each transaction record of the transaction data may include eight data fields X1-X8.

As shown in FIG. 6, at step 604, implementation 600 may include categorizing fields of the data, as described herein. For example, a system (e.g., transaction service provider system 102, categorization system 402a, and/or data quality modeling system 402b) may categorize each respective data field of the transaction records into a respective type of a plurality of types. For example, the system may categorize at least a subset (e.g., X1, X3, X5, and X8) of the data fields of each transaction record into the numeric type, as described herein.

As shown in FIG. 6, at step 606, implementation 600 may include determining data quality based on the type (e.g., numeric type), as described herein. For example, a system (e.g., transaction service provider system 102 and/or data quality modeling system 402b) may determine a data quality score for each respective data field of the subset of data fields (e.g., X1, X3, X5, and X8) based on the respective type thereof (e.g., numeric type).

In some non-limiting embodiments, as shown in FIG. 6, at step 606a, implementation 600 may include adding interactions by generating a vector including a plurality of elements including an element for each value of the numeric data fields (e.g., X1, X3, X5, and X8) and for each interaction of at least two values of the numeric data fields (e.g., X1*X3, X1*X5, X1*X8, X3*X5, X3*X8, X5*X8), as described herein. In some non-limiting embodiments, interactions may include all possible multiplications of two elements (e.g., values) of the numeric data fields (e.g., X1, X3, X5, and X8), as described herein.

In some non-limiting embodiments, as shown in FIG. 6, at step 606b, implementation 600 may include creating tuples, as described herein. For example, a plurality of tuples may be generated based on the plurality of elements of the vector, as described herein. For example, each tuple may include a subset of three elements of the vector (e.g., a tuple for each possible combination of all possible combinations of three elements from the vector).

In some non-limiting embodiments, as shown in FIG. 6, at step 606c, implementation 600 may include removing outliers. For example, outliers may be identified based on robust linear model (RLM) regression, inter-quartile range, extreme values, null values, 0 values for a dependent variable (e.g., y-axis), any combination thereof, and/or the like. Once identified, the outliers may be removed.

In some non-limiting embodiments, as shown in FIG. 6, at step 606d, implementation 600 may include performing a regression on each tuple, as described herein. For example, a regression (e.g., linear regression, a linear least squares regression, an RLM regression, a polynomial regression, any combination thereof, and/or the like) may be performed on each tuple to provide an error value for each tuple, as described herein. Additionally or alternatively, the error value of at least one tuple (e.g., of the plurality of tuples) may be determined to satisfy a data quality threshold (e.g., selectable threshold value and/or the like). For example, any tuple that satisfies the data quality threshold may be scored (e.g., marked, flagged, labeled, and/or the like) as a valid relationship (e.g., the tuple may have sufficient data quality).

In some non-limiting embodiments, as shown in FIG. 6, at step 606e, implementation 600 may include saving (e.g., storing) a pattern associated with the tuples that satisfy the data quality threshold. For example, at least one of a coefficient value, an intercept value, any combination thereof, and/or the like may be stored based on the regression for the tuple(s) that satisfies the data quality threshold.

Figure 7:
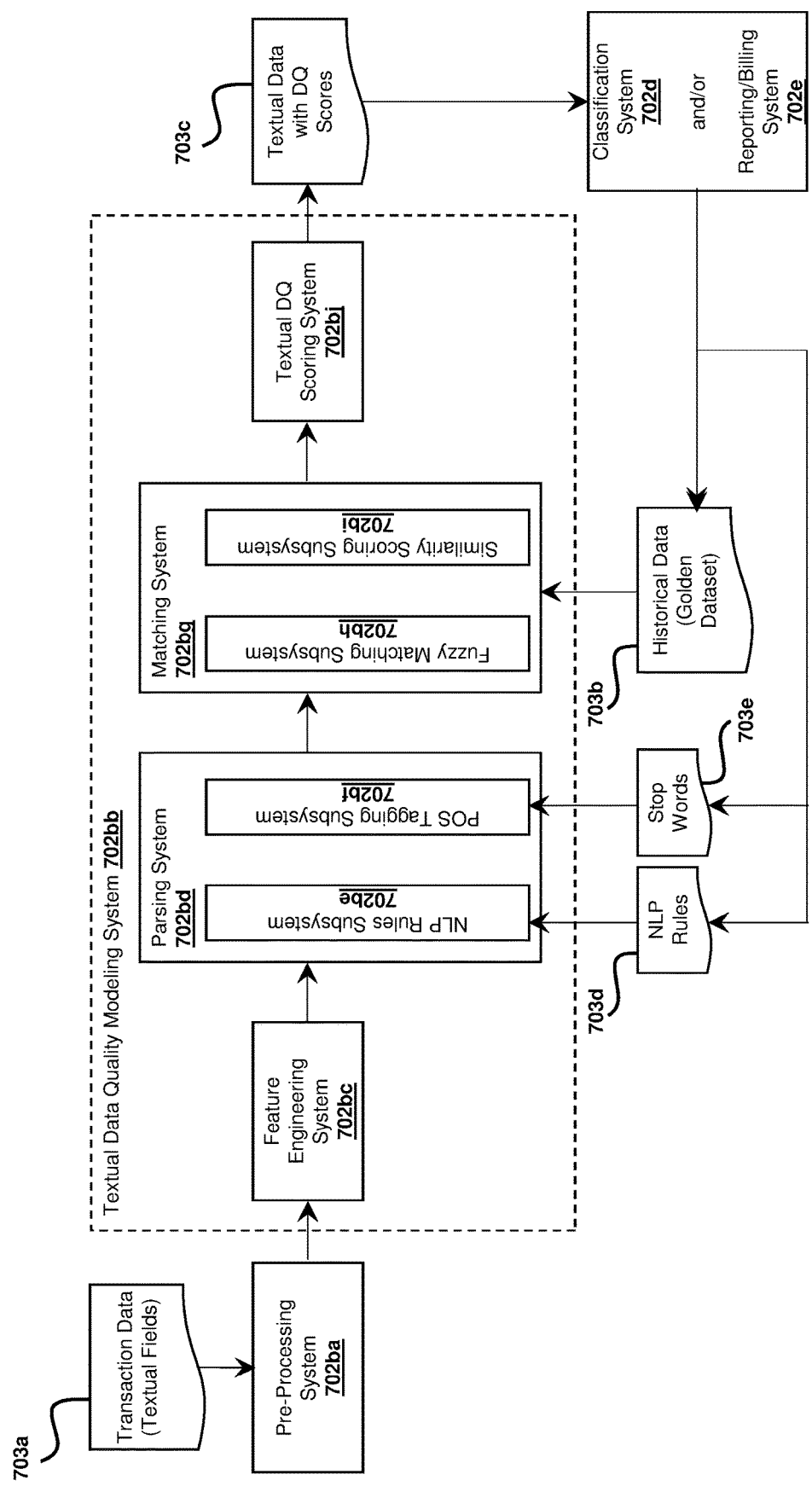
FIG. 7 is a diagram of a non-limiting embodiment of an implementation of a non-limiting embodiment of the process shown in FIG. 3 according to the principles of the presently disclosed subject matter.

Referring now to FIG. 7, FIG. 7 is a diagram of an exemplary implementation 700 of a non-limiting embodiment relating to process 300 shown in FIG. 3. As shown in FIG. 7, implementation 700 may include pre-processing system 702ba, textual data quality modeling system 702bb, feature engineering system 702bc, parsing system 702bd, NLP rules subsystem 702be, part of speech tagging subsystem 702bf, matching system 702bg, fuzzy matching subsystem 702bh, similarity scoring subsystem 702bi, textual data quality scoring system 702bj, classification system 702d, reporting/billing system 702e, transaction data 703a, historical data 703b, textual data with data quality scores 703c, NLP rules 703d, and/or stop-words 703e. In some non-limiting embodiments, pre-processing system 702ba, textual data quality modeling system 702bb, feature engineering system 702bc, parsing system 702bd, NLP rules subsystem 702be, part of speech tagging subsystem 702bf, matching system 702bg, fuzzy matching subsystem 702bh, similarity scoring subsystem 702bi, and/or textual data quality scoring system 702bj may be the same as, similar to, part of, and/or implemented by (e.g., completely, partially, and/or the like) transaction service provider system 102 and/or data quality modeling system 402b. In some non-limiting embodiments, classification system 702d may be the same as, similar to, part of, and/or implemented by (e.g., completely, partially, and/or the like) transaction service provider system 102 and/or classification system 402d. In some non-limiting embodiments, reporting/billing system 702e may be the same as, similar to, part of, and/or implemented by (e.g., completely, partially, and/or the like) transaction service provider system 102 and/or reporting/billing system 402e.

In some non-limiting embodiments, pre-processing system 702ba may receive at least one textual data field of a plurality of transaction records of transaction data 703a (e.g., after categorization of such data fields into the textual type), as described herein. In some non-limiting embodiments, conducting the data pre-processing may include pre-processing system 702ba performing a text cleaning process on textual data located in the textual data field(s) of transaction record(s) of transaction data 703*a* to produce cleaned textual data and storing a value that includes the cleaned textual data in modified textual data field(s) associated with the transaction record(s), as described herein. For example, the text cleaning process may include changing upper case alphabetical characters to lower case alphabetical characters in the textual data located in the textual data field(s) and/or removing specified characters from the textual data located in the first textual data field of the first transaction record, as described herein. Additionally or alternatively, the specified characters may include at least one of the following: a number character, an empty character space, a hash code character, a punctuation character, any combination thereof, and/or the like, as described herein. In some non-limiting embodiments, conducting the data pre-processing may include pre-processing system 702*ba* extracting a root (e.g., lemma) of a word that is included in textual data located in the textual data field(s) and storing a value that includes the root of the word in modified textual data field(s) associated with the transaction record, as described herein.

In some non-limiting embodiments, feature engineering system 702*bc* of textual data quality modeling system 702*bb* may determine feature values associated with each textual data field in each transaction record, as described herein. For example, at least one feature may be determined (e.g., generated), such as total word count in the textual data field, words with only numbers in the textual data field, words with only alphabetical characters in the textual data field, alphanumeric words in the textual data field, number of digits in the textual data field, number of letters in the textual data field, letter-to-number ratio in the textual data field, any combination thereof, and/or the like. Additionally or alternatively, feature engineering system 702*bc* may store such features in association with the respective transaction record from which they were determined.

In some non-limiting embodiments, the feature values may be used in parsing system 702*bd* of textual data quality modeling system 702*bb* (e.g., after conducting data pre-processing and feature engineering on transaction data 703*a*). For example, parsing system 702*bd* may include NLP rules subsystem 702*be*, which may apply NLP rules 703*d* based on the features. For example, examples of such NLP rules 703*d* may include whether the textual data field contains no alphabetical characters (e.g., letters), whether the textual data field contains very few (e.g., below a selectable threshold) alphabetical characters, whether the letter-to-number ratio is very low (e.g., below a selectable threshold), and/or the like. In some non-limiting embodiments, NLP rules subsystem 702*be* may determine whether the feature values associated with the textual data field satisfy at least one NLP rule 703*d*.

In some non-limiting embodiments, parsing system 702*bd* may include part of speech tagging subsystem 702*bf*. Additionally or alternatively, part of speech tagging subsystem 702*bf* may apply tagging on the textual data field to automatically identify stop-words 703*e*, as described herein. For example, speech tagging subsystem 702*bf* may determine whether textual data located in each textual data field corresponds to a specified stop-word, as described herein. In some non-limiting embodiments, part of speech tagging subsystem 702*bf* may allow a user to input (e.g., select, add, remove, update, and/or the like) stop-words 703*e*.

In some non-limiting embodiments, textual data quality modeling system 702*bb* may include matching system 702*bg*, which may determine whether textual data located in the textual data field(s) matches (e.g., corresponds to and/or the like) historical data 703*b* (e.g., a golden dataset and/or the like). In some non-limiting embodiments, matching system 702*bg* may determine whether textual data located in the textual data field(s) of the transaction record(s) of transaction data 703*a* correspond to historical data 703*b*, as described herein. For example, matching system 702*bg* may include a fuzzy matching subsystem 702*bh*, which may identify similarity of the textual data located in the textual data field(s) with the historical data 703*b* (e.g., by finding the partial token ratio, token set ratio, and/or the like) to measure the similarity between the textual data located in the textual data field(s) and historical data 703*b*. For example, if such ratios exceed a respective threshold (e.g., 90 and/or the like), the textual data located in the textual data field(s) may be considered a valid description.

In some non-limiting embodiments, matching system 702*bg* may include a similarity scoring subsystem 702*bi*, which may determine a similarity score (e.g., trained on the selected language, such as English language) between two strings: the textual data located in the textual data field(s) of the transaction data 703*a* and the historical data 703*b*. For example, with historical data 703*b* as reference, a similarity score that satisfies a threshold (e.g., a high value exceeding the threshold and/or the like) may indicate that the textual data located in the textual data field(s) may be considered a valid description. Additionally or alternatively, similarity scoring subsystem 702*bi* may carry out a merchant category level slicing of transaction data 703*a* and/or identify when the textual data located in the textual data field(s) may be considered a valid description, but the same value exists across all transaction records from a given source (e.g., merchant system 108, acquirer system 110, and/or the like), which may be a result of that source communicating fabricated data.

In some non-limiting embodiments, textual data quality modeling system 702*bb* may include textual data quality scoring system 702*bj*, which may determine a data quality score for each textual data field included in transaction data 703*a*, as described herein. Additionally or alternatively, textual data quality scoring system 702*bj* may output the data quality scores (e.g., textual data with data quality scores 703*c* and/or the like) to classification system 702*d* and/or reporting/billing system 702*e*, as described herein.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:
1. A computer-implemented method for monitoring and improving data quality of transaction data, comprising:
 receiving, with at least one processor, transaction data associated with a plurality of payment transactions from an acquirer system, the transaction data comprising a transaction record associated with each payment transaction of the plurality of payment transactions, each transaction record comprising a plurality of data fields;

categorizing, with at least one processor, each respective data field of the plurality of data fields into a respective type of a plurality of types; and determining, with at least one processor, a data quality score for each respective data field of the plurality of data fields based on the respective type of the respective data field, wherein a first subset of data fields of the plurality of data fields comprises numeric data fields, and wherein determining the data quality score for the numeric data fields comprises:

generating, with at least one processor, a vector comprising a plurality of elements, the plurality of elements comprising an element for each value of the numeric data fields and for each interaction of at least two values of the numeric data fields;

generating, with at least one processor, a plurality of tuples based on the plurality of elements;

performing, with at least one processor, a regression on each tuple of the plurality of tuples to provide an error value for each tuple of the plurality of tuples;

determining, with at least one processor, the error value of at least one tuple of the plurality of tuples satisfies a data quality threshold; and storing, with at least one processor, at least one of a coefficient value, an intercept value, or any combination thereof based on the regression for the at least one tuple that satisfies the data quality threshold.

2. The computer-implemented method of claim 1, further comprising:

selecting, with at least one processor, a subset of the plurality of data fields based on an application, wherein categorizing comprises categorizing each respective data field of the subset into the respective type of the plurality of types.

3. The computer-implemented method of claim 1, wherein the plurality of types comprises a date type, a categorical type, an identifier type, a textual type, and a numeric type, and wherein categorizing comprises categorizing each respective data field of the plurality of data fields into one of the date type, the categorical type, the identifier type, the textual type, or the numeric type.

4. The computer-implemented method of claim 3, wherein categorizing comprises, for each respective data field:

categorizing the respective data field into the date type if data contained in the respective data field at least one of: is formatted as at least one of a standard date format, a standard time format, a standard date and time format, or any combination thereof; satisfies at least one of a date function, a time function, a date and time function, or any combination thereof; or any combination thereof;

categorizing the respective data field into the categorical type based on a statistical distribution of values in the data contained in the respective data field and a threshold of unique values;

categorizing the respective data field into the identifier type based on a degree of uniqueness of the values in the data contained in the respective data field; categorizing the respective data field into the textual type based on at least one of a plurality of regular expression functions; a number of combinations of punctuation, alphabetical characters, and digits of the data contained in the respective data field; or any combination thereof; and categorizing the respective data field into the numeric type if the data contained in the respective data field includes only digits and up to one decimal point.

5. The computer-implemented method of claim 1, wherein a first data field of the plurality of data fields comprises a textual data field, the method further comprising:

conducting, with at least one processor, data pre-processing on the transaction data;

determining, with at least one processor, feature values associated with the textual data field in each transaction record, wherein the feature values are used in a parsing layer of a natural language processing (NLP) model after conducting data pre-processing on the transaction data; and determining, with at least one processor, whether the feature values associated with the textual data field satisfy at least one rule associated with the parsing layer of the NLP model, wherein determining the data quality score comprises determining the data quality score for the textual data field included in the transaction data based on determining whether the feature values associated with the textual data field satisfy the at least one rule associated with the parsing layer of the NLP model.

6. The computer-implemented method of claim 5, wherein conducting the data pre-processing comprises:

performing a text cleaning process on textual data located in a first textual data field of a first transaction record to produce cleaned textual data; and storing a value that includes the cleaned textual data in a first modified textual data field associated with the first transaction record.

7. The computer-implemented method of claim 6, wherein performing the text cleaning process comprises:

changing upper case alphabetical characters to lower case alphabetical characters in the textual data located in the first textual data field of the first transaction record; and removing specified characters from the textual data located in the first textual data field of the first transaction record, wherein the specified characters include at least one of the following:
a number character,
an empty character space,
a hash code character,
a punctuation character, or
any combination thereof.

8. The computer-implemented method of claim 5, wherein conducting the data pre-processing comprises:

extracting a root of a word that is included in textual data located in a first textual data field of a first transaction record; and storing a value that includes the root of the word in a first modified textual data field associated with the first transaction record.

9. The computer-implemented method of claim 5, further comprising:

determining whether textual data located in a first textual data field of a first transaction record corresponds to a specified stop-word;

determining a lowest value of a data quality score for the textual data located in the first textual data field based on determining that the textual data located in the first textual data field of the first transaction record corresponds to the specified stop-word; and assigning the lowest value of the data quality score to the textual data located in the first textual data field.

10. The computer-implemented method of claim 5, further comprising:
determining whether textual data located in a first textual data field of a first transaction record corresponds to a historical textual description; and
determining a data quality score for the textual data located in the first textual data field based on determining that the textual data located in the first textual data field of the first transaction record corresponds to the historical textual description.

11. The computer-implemented method of claim 10, wherein determining the data quality score for the textual data located in the first textual data field comprises:
determining the data quality score for the textual data located in the first textual data field based on a level of correspondence between the textual data located in the first textual data field of the first transaction record and the historical textual description.

12. The computer-implemented method of claim 1, wherein each interaction comprises a multiplication of the value of a first numeric data field of the numeric data fields and the value of a second numeric data field of the numeric data fields.

13. The computer-implemented method of claim 1, wherein each tuple of the plurality of tuples comprises a subset of three elements of the plurality of elements.

14. The computer-implemented method of claim 1, wherein a second subset of data fields of the plurality of data fields comprises date data fields, the method further comprising:
detecting, with at least one processor, a formatting of each date data field; and
determining, with at least one processor, a relationship distribution between each date data field and at least one other date data field,
wherein determining the data quality score comprises determining the data quality score for each date data field based on the formatting and the relationship distribution.

15. The computer-implemented method of claim 1, wherein a first data field of the plurality of data fields comprises an identifier data field and each transaction record comprises identifier data associated with the identifier data field, the method further comprising:
determining, with at least one processor, the identifier data associated with the identifier data field in each transaction record is unique from the identifier data associated with the textual data field in other transaction records of the transaction data; and
determining, with at least one processor, the identifier data associated with the identifier data field in each transaction record is unique from historical identifier data associated with the identifier data field in historical transaction records.

16. The computer-implemented method of claim 1, wherein a first data field of the plurality of data fields comprises a categorical data field and each transaction record comprises categorical data associated with the categorical data field, the method further comprising:
determining, with at least one processor, the categorical data associated with the categorical data field in each transaction record matches historical categorical data associated with the categorical data field in at least one historical transaction record; and determining, with at least one processor, a percentage of transaction records for which the categorical data associated with the categorical data field therein matches the historical categorical data associated with the categorical data field in the at least one historical transaction record,
wherein determining the data quality score comprises determining the data quality score for the categorical data field based on the percentage.

17. A system for monitoring and improving data quality of transaction data, comprising:
at least one processor programmed or configured to:
receive transaction data associated with a plurality of payment transactions from an acquirer system, the transaction data comprising a transaction record associated with each payment transaction of the plurality of payment transactions, each transaction record comprising a plurality of data fields;
categorize each respective data field of the plurality of data fields into a respective type of a plurality of types; and
determine a data quality score for each respective data field of the plurality of data fields based on the respective type of the respective data field, wherein a first subset of data fields of the plurality of data fields comprises numeric data fields, and wherein determining the data quality score for the numeric data fields comprises:
generating a vector comprising a plurality of elements, the plurality of elements comprising an element for each value of the numeric data fields and for each interaction of at least two values of the numeric data fields;
generating a plurality of tuples based on the plurality of elements;
performing a regression on each tuple of the plurality of tuples to provide an error value for each tuple of the plurality of tuples;
determining the error value of at least one tuple of the plurality of tuples satisfies a data quality threshold; and
storing at least one of a coefficient value, an intercept value, or any combination thereof based on the regression for the at least one tuple that satisfies the data quality threshold.

18. The system of claim 17, wherein a first data field of the plurality of data fields comprises a textual data field, wherein the at least one processor is further programmed or configured to:
conduct data pre-processing on transaction data associated with a plurality of payment transactions received from an acquirer;
determine feature values associated with a textual data field in each transaction record of a plurality of transaction records included in the transaction data associated with the plurality of payment transactions, wherein the feature values are used in a parsing layer of a natural language processing (NLP) model after conducting data pre-processing on the transaction data associated with the plurality of payment transactions;
determine whether the feature values associated with the textual data field satisfy at least one rule associated with the parsing layer of the NLP model;
determine a data quality score for each textual data field of each transaction record of the plurality of transaction records included in the transaction data based on determining whether the feature values associated with the textual data fields satisfy the at least one rule associated with the parsing layer of the NLP model;

determine whether textual data located in a first textual data field of a first transaction record included in the plurality of transaction records corresponds to a specified stop-word;

determine a lowest value of a data quality score for the textual data located in the first textual data field based on determining that the textual data located in the first textual data field of the first transaction record corresponds to the specified stop-word; and assign the lowest value of the data quality score to the textual data located in the first textual data field.

19. A computer program product for monitoring and improving data quality of transaction data, comprising at least one non-transitory computer-readable medium including one or more instructions that, when executed by at least one processor, cause the at least one processor to:

receive transaction data associated with a plurality of payment transactions from an acquirer system, the transaction data comprising a transaction record associated with each payment transaction of the plurality of payment transactions, each transaction record comprising a plurality of data fields;

categorize each respective data field of the plurality of data fields into a respective type of a plurality of types; and determine a data quality score for each respective data field of the plurality of data fields based on the respective type of the respective data field, wherein a first subset of data fields of the plurality of data fields comprises numeric data fields, and wherein determining the data quality score for the numeric data fields comprises:

generating a vector comprising a plurality of elements, the plurality of elements comprising an element for each value of the numeric data fields and for each interaction of at least two values of the numeric data fields;

generating a plurality of tuples based on the plurality of elements;

performing a regression on each tuple of the plurality of tuples to provide an error value for each tuple of the plurality of tuples;

determining the error value of at least one tuple of the plurality of tuples satisfies a data quality threshold; and storing at least one of a coefficient value, an intercept value, or any combination thereof based on the regression for the at least one tuple that satisfies the data quality threshold.

* * * * *

UNITED STATES PATENT AND TRADEMARK OFFICE
CERTIFICATE OF CORRECTION

PATENT NO. : 11,693,836 B2
APPLICATION NO. : 16/927593
DATED : July 4, 2023
INVENTOR(S) : Chiranjeet Chetia et al.

It is certified that error appears in the above-identified patent and that said Letters Patent is hereby corrected as shown below:

In the Claims

Column 39, Line 53, Claim 1, delete "or any combination thereof; or any combination thereof;" and insert -- or any combination thereof; --

Signed and Sealed this
Tenth Day of October, 2023

Katherine Kelly Vidal
*Director of the United States Patent and Trademark Office*